(12) United States Patent
Neves

(10) Patent No.: US 8,568,240 B1
(45) Date of Patent: Oct. 29, 2013

(54) SYSTEM AND METHOD FOR CONDUCTING ENDURANCE SPORTING CONTEST AND COMPETITION WITH INTERMEDIATE EVENT-BASED STAGES

(76) Inventor: Roy Neves, Houston, TX (US)

( * ) Notice: Subject to any disclaimer, the term of this patent is extended or adjusted under 35 U.S.C. 154(b) by 0 days.

(21) Appl. No.: 13/199,017

(22) Filed: Aug. 17, 2011

(51) Int. Cl.
 *A63F 13/00* (2006.01)
(52) U.S. Cl.
 USPC .................... 463/42; 463/20; 463/40; 463/41
(58) Field of Classification Search
 USPC .......................................... 463/20, 40, 41, 42
 See application file for complete search history.

(56) References Cited

U.S. PATENT DOCUMENTS

| | | | | |
|---|---|---|---|---|
| 6,127,975 | A * | 10/2000 | Maloney | 342/457 |
| 7,896,743 | B2 * | 3/2011 | Parisien | 463/42 |
| 2008/0254887 | A1 * | 10/2008 | Kiong | 463/42 |
| 2011/0004513 | A1 * | 1/2011 | Hoffberg | 705/14.1 |
| 2011/0032105 | A1 * | 2/2011 | Hoffman et al. | 340/573.1 |

* cited by examiner

*Primary Examiner* — Sunit Pandya
*Assistant Examiner* — Shahid Kamal
(74) *Attorney, Agent, or Firm* — D. Scott Hemingway; Hemingway & Hansen, LLP

(57) ABSTRACT

The present invention conducts, monitors, and regulates the sporting-event that takes place over an extended geographic area, during an extended time period, with intermediate event-based stages occurring before arriving at the finish line. The sporting competition will require the participants to demonstrate a multitude of skills with each participant having to complete a task or tasks at each intermediate stage in the competition prior to proceeding to the next stage, and ultimately, to finish the race. To finish, a contestant, or team of contestants, must have accomplished a task or set of tasks at each intermediate stage for each of the designated segments along the course route of the contest. In that way, the present invention will conduct an endurance race that is more akin to marathon foot race with intermediate event-based stages, as opposed to a modern fishing competition.

15 Claims, 14 Drawing Sheets

RULE ASSUMPTIONS ~203

Teams consist of TWO Fishermen

Transportation by Motorized Boat (no trailering)

Seven Stage Areas

Team must catch one of 3 Species in each Stage Area

Team must catch at least one of the 3 before finishing

Each Team Member must catch at least one of the 3 before finishing

Team Records only One species per area

TEAM AND INDIVIDUAL SPECIES FLAG KEY (EXAMPLE) ~255

TEAM: [RFT] TEAM has recorded Redfish, Flounder, and Trout (Has all Qualifying Species required to finish)

A: [RFT] TEAM MEMBER A has recorded Redfish, Flounder, and Trout (Has all Qualifying Species Required to finish)

B: [RT] TEAM MEMBER B has recorded Redfish and Trout (does NOT have all Qualifying Species required to finish - still needs Flounder)

*FIG. 7E*

SYSTEM AND METHOD FOR CONDUCTING ENDURANCE SPORTING CONTEST AND COMPETITION WITH INTERMEDIATE EVENT-BASED STAGES

TECHNICAL FIELD

The present invention relates to systems and methods for a unique form of competition or contests in the sport of fishing and hunting.

BACKGROUND OF THE INVENTION

A sport is an organized, competitive, entertaining, and skillful activity requiring commitment, strategy, and fair play, in which a winner can be defined by objective means. Generally speaking, a sport is a game based in physical athleticism.

Sports and sporting competitions are governed by a set of rules or customs. Physical events such as scoring goals or crossing a line first often define the result of a sporting competition. However, the degree of skill and performance in some sports, such as diving, dressage and figure skating, is judged according to well-defined criteria.

There are artifacts and structures that suggest that the Chinese engaged in sporting activities as early as 2000 BC. Traces of the earliest sports activities, such as hunting, archery and rowing race, can be seen from some bronze ware of the late Neolithic Age as well as from other articles. For example, artifacts such as a lacquered wooden comb of the Qin Dynasty (221-206 BC) feature an ancient Chinese sports activity called "jiaodi." Of early origin, it is a game similar to wrestling of modern times. The ancient "jiaodi" was performed by athletes wearing ox horns and wrestling with each other imitating wild oxen. Various sports activities can be found in historic expressions such as mural paintings, stone paintings, brick paintings, pottery figurines and poems.

Monuments to the Pharaohs indicate that a number of sports, including swimming and fishing, were well-developed and regulated several thousands of years ago in ancient Egypt. Other Egyptian sports included javelin throwing, high jump, and wrestling. Ancient Persian sports such as the traditional Iranian martial art of Zourkhaneh had a close connection to the warfare skills. Among other sports that originate in ancient Persia are polo and jousting.

A wide range of sports were already established by the time of Ancient Greece and the military culture and the development of sports in Greece influenced one another considerably. Sports became such a prominent part of their culture that the Greeks created the Olympic Games, which in ancient times were held every four years in a small village in the Peloponnesus called Olympia.

Sports have been increasingly organized and regulated from the time of the ancient Olympics up to the present century. Industrialization has brought increased leisure time to the citizens of developed and developing countries, leading to more time for citizens to attend and follow spectator sports, greater participation in athletic activities, and increased accessibility. These trends continued with the advent of mass media and global communication. Professionalism became prevalent, further adding to the increase in sport's popularity, as sports fans began following the exploits of professional athletes through radio, television, and the internet—all while enjoying the exercise and competition associated with amateur participation in sports.

Records are kept and updated for most sports at the highest levels, while failures and accomplishments are widely publicized in sport news. While conduct may vary, sports participants are expected to display good sportsmanship, and observe standards of conduct such as being respectful of opponents and officials, and congratulating the winner when losing.

Modern fishing contests or tournaments are common recreational competitions on lakes, bays, rivers and larger saltwater bodies, generally focusing on the number of fish of a specific species caught or the weight (combined or otherwise) of the fish caught, during a specific time period on a single body of water.

As well as being a form of recreation for the participants, much sport is played in front of an audience. Most professional sport is played in a theatre of some kind; be it a stadium, arena, golf course, race track, or the open road, with provision for the (often paying) public. Large television or radio audiences are also commonly attracted, with rival broadcasters bidding large amounts of money for the rights to show certain fixtures.

The football World Cup attracts a global television audience of hundreds of millions; the 2006 final alone attracted an estimated worldwide audience of well over 700 million. The Cricket World Cup is another sporting event which attracts a global audience. The 2007 Cricket World Cup attracted about 2.3 Billion viewers all over the world. In the United States, the championship game of the NFL, the Super Bowl, has become one of the most watched television broadcasts of the year. Super Bowl Sunday is a de facto national holiday in America; the viewership being so great that in 2007 advertising space was reported as being sold at $2.6 m for a 30 second slot.

SUMMARY OF THE INVENTION

There are a number of advantages of the proposed and preferred system and method for conducting an endurance competition or contest (e.g. hunting or fishing competition) with event-based intermediate stages. Specifically, the present invention conducts the sporting competition by keeping track of, monitoring, and regulating an endurance sporting competition through its various intermediate event-based stages. The sporting competition will require the participants to demonstrate a multitude of skills, along with a certain amount of the "luck of the catch" at the various intermediate stages. The participant has to complete a task or tasks at each stage in the competition prior to proceeding to the next stage, and ultimately, to finish the race. The present invention conducts, monitors, and regulates the sporting-event that takes place over an extended geographic area, during an extended time period, with intermediate event-based stages occurring before arriving at the finish line.

In comparison to existing sporting competitions that only test the abilities of the contestants to perform a certain activity (e.g., catch as many largemouth bass as possible) in a single environment (e.g., a single lake) in a predetermined period of time (e.g., four hour period), the proposed competition is much broader in scope and its requirements. In a fishing competition, the proposed contest system may vary both the type and the size of fish sought as well as the location over which the fish must be caught. In addition, the time period may be extended or shortened, so that the contestant must catch the fish in a certain time period (e.g., 24 hours) or all of the fish in a combined time period (e.g., 7 days) or be disqualified or disadvantaged in some manner.

Awards and/or prizes may be awarded for First, Second, Third, or any other place that completes the tasks and makes it to the finish. Consequently, the proposed contest system requires competing participants to not only display superior skill and "luck of the catch," but to also engage in a test of endurance—testing physical stamina and the durability of their equipment.

The proposed contest system is an event-driven event with an endurance component. In one embodiment, the system would combine a fishing tournament and a first-to-the-finish line race. Existing fishing competitions are very similar to one another, with minor differences in the specific fish targeted, the location of the contest, the methodology for scoring the recorded catches, and the methodology for ranking and awarding winners of the contest. The proposed contest system would support a more challenging, complex and interesting competition to the contestants as well as to the spectators. Because of its unique and variable aspects, a unique system is needed to account, monitor and support the competition.

The proposed invention is a system and/or method that conducts a sporting competition that does not focus on the quantity of scoring (e.g. recorded catches in fishing competition) during a predetermined time period, but rather on a race to a finish line over an extended distance (without or without planned stops) where each intermediate stage requires completing particular tasks to qualify for progressing to the next stage of the race. The outcome of the contest may be decided, primarily, on who finishes the predetermined course in the shortest amount of time or on accumulated point totals that are tallied by the system. To finish, a contestant, or team of contestants, must have accomplished a task or set of tasks at each intermediate stage (e.g. recorded the required catches) for each of the designated segments along the course route of the contest. In that way, the present invention will conduct an endurance race that is more akin to marathon foot race with intermediate event-based stages, as opposed to a modern fishing competition.

BRIEF DESCRIPTION OF THE DRAWINGS

The novel features believed characteristic of the invention are set forth in the appended claims. The invention itself, however, as well as preferred modes of use, further objectives, and advantages thereof, will be best understood by reference to the following detailed description of illustrative embodiments when read in conjunction with the accompanying drawings, wherein:

DETAILED DESCRIPTION OF THE PREFERRED EMBODIMENTS

Figure 1:
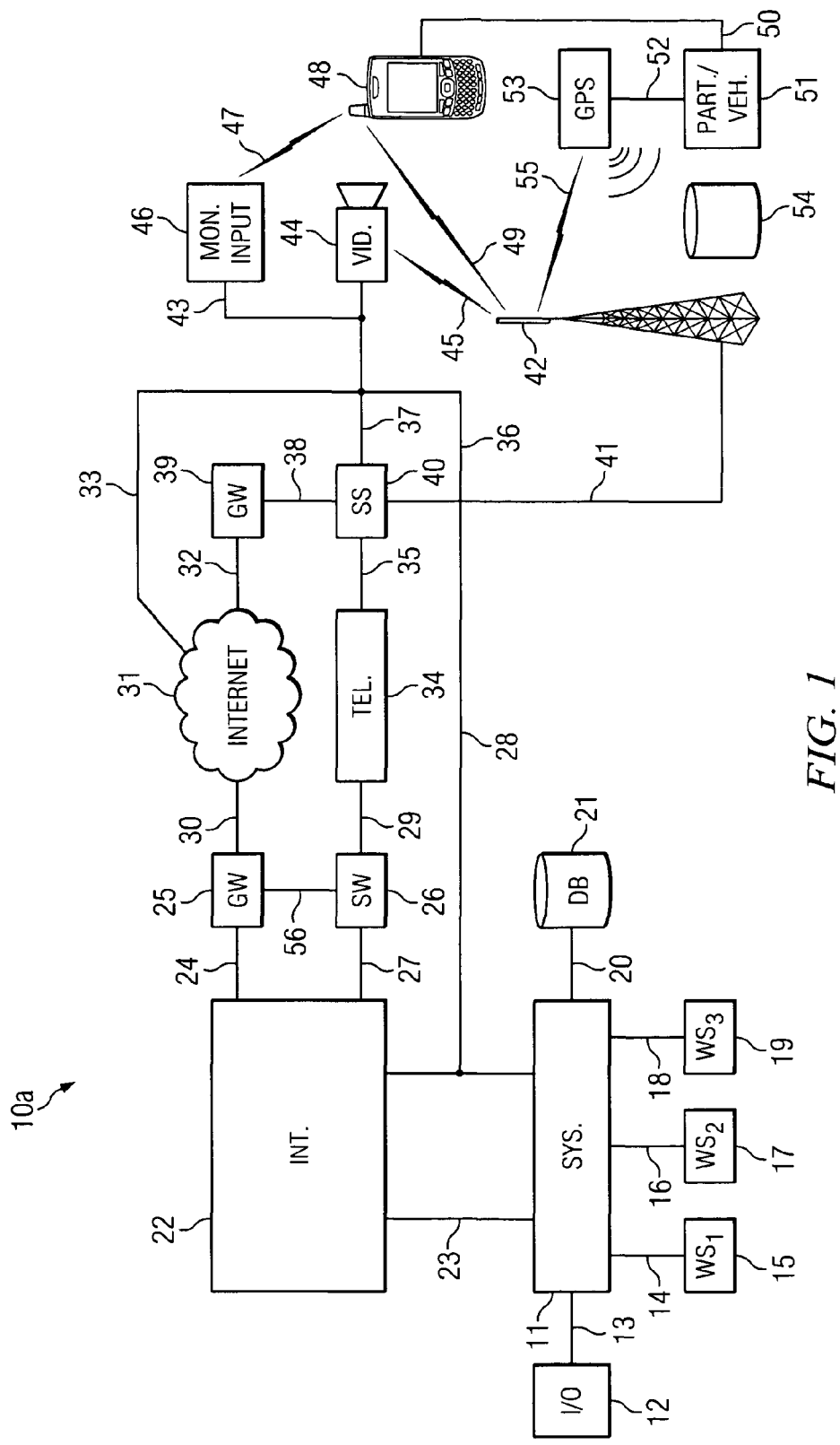
FIG. 1 is a system configuration illustrating the components and system interconnections for input information in the present invention.

In FIG. 1, the information input components and system interconnection 10a are shown with the computer-based system 11 being coupled to an input-output device 12 via connection 13, workstation $WS_1$ 15 via connection 14, workstation $WS_2$ 17 via connection 16, workstation $WS_3$ 19 via connection 18, and a memory database 21 via connection 20. Information input into the system 11 can be captured and received by the parts of the system 10a shown in FIG. 1. The computer-based system 11 has a central processing unit, memory, and ports for supporting input/output connections. The computer-based system 11 is coupled to an interface 22 via connection 23, and the interface is coupled to a gateway 25 via connection 24 and a telephone switch 26 via a connection 27. The telephone switch 26 is coupled to the gateway 25 via connection 56. The gateway 25 is coupled to the Internet 31 via connection 30, and the telephone switch 26 is coupled to a telephone network 34 via connection 29.

A mobile unit 48 associated with a participant in the competition or that participant's vehicle is coupled by a radio signal 49 to a radio access network antenna 42. The mobile unit 48 can transmit information from the participant includes event-based information, completion of tasks, photo documentation of task completion, location information or other information about the progress of the participant in the competition. The format of these transmissions can be electronic mail, text messages, instant messaging, or uploading of information onto the computer system 11, social network site or applications program devoted to the participant or the sporting competition. The mobile unit 48 is coupled to the participant vehicle 51 via connection 50, and a GPS (global positioning satellite) unit 53. The GPS unit 53 obtains positioning satellite signals from several geosynchronous satellite(s) 54 in order to calculate positioning and location information. This positioning and location information is transmitted to the system 11 via radio transmission 55 or through the radio transmission 49 through the mobile unit 48.

The progress of the competition can be monitored by the monitor input unit 46, which can be coupled to the computer system 11 via the connection 43 and 28. Alternatively, the information input into the monitor input unit 46 can be transmitted to the computer system via the telephone network using connection 43, 36 and 37, or the Internet 31 connection via connection 43, 36 and 32. Also, the information input into the monitor input unit 46 can be transmitted to the computer system 11 via a radio transmission 47 through the radio access network 42 and 40, and through the telephone network 34 or the Internet network 31. The information input into the monitor can be input by a participant, an observer, or a judge associate with the competition.

The progress of the competition can be visually recorded or provided in real-time by video unit 44, which can be coupled to the computer system via connection 28. Alternatively, the information input into the monitor input unit 46 can be transmitted to the computer system via the telephone network using connection 43, 36 and 37, or the Internet 31 connection via connection 43, 36 and 32. Also, the information input into the monitor input unit 46 can be transmitted to the computer system 11 via a radio transmission 47 through the radio access network 42 and 40, and through the telephone network 34 or the Internet network 31. The information input into the monitor can be input by a participant, an observer, or a judge associate with the competition.

The radio access network includes radio access network antenna 42 coupled to a substation switch SS 40 via connection 41. The substation switch SS 40 is coupled to the gateway GW 39 via connection 38. The substation switch SS is coupled to a telephone network 34 via connection 35 or the Internet 31 via connection 37 and 33. The gateway is coupled to the Internet 31 via connection 32.

Figure 2:
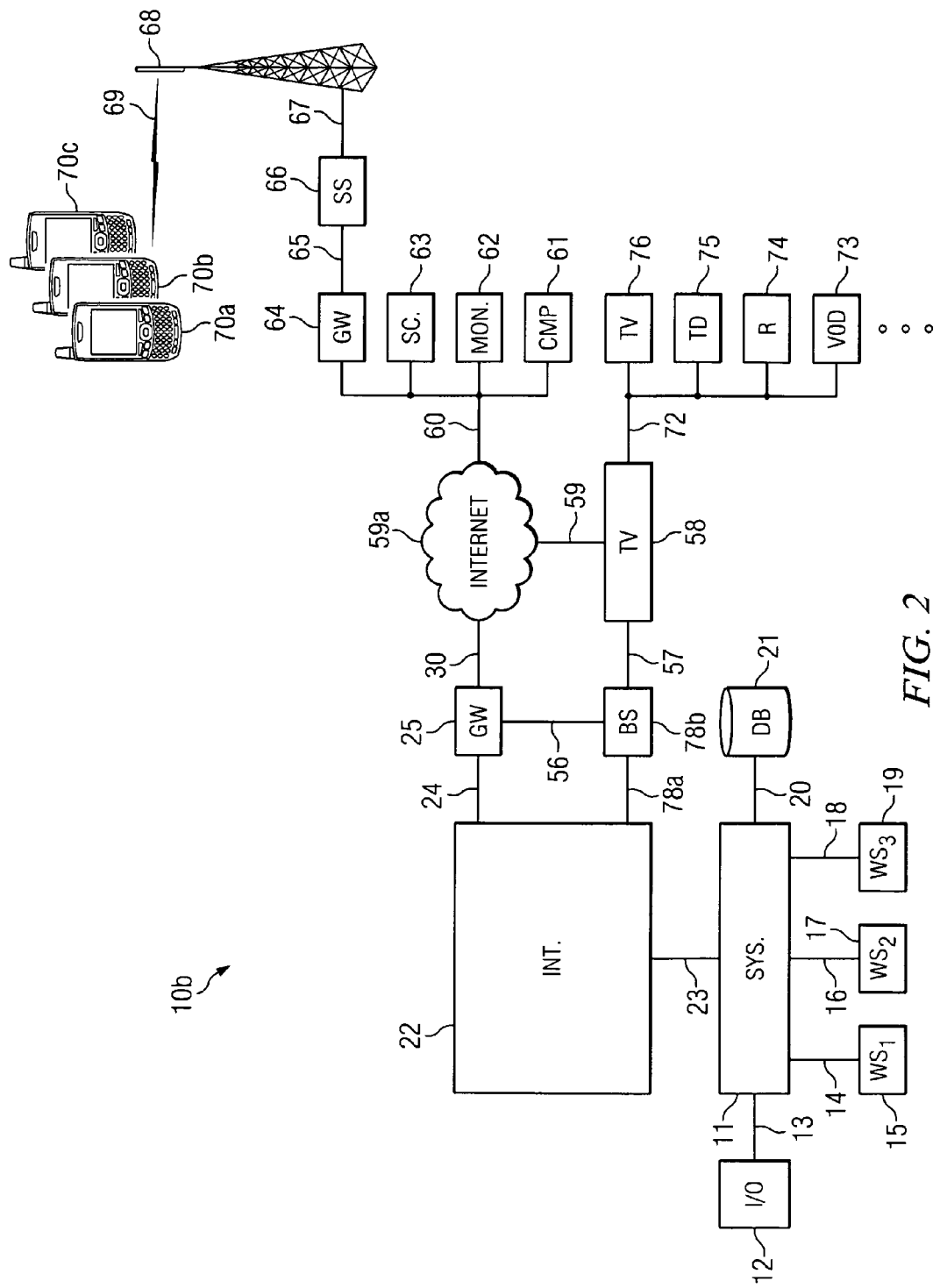
FIG. 2 is a system configuration illustrating the components and system interconnections for output information in the present invention.

In FIG. 2, the system components and interconnections 10b associated with information output are shown with system 11 being coupled to an input-output device 12 via connection 13, workstation $WS_1$ 15 via connection 14, workstation $WS_2$ 17 via connection 16, workstation $WS_3$ 19 via connection 18, and a memory database 21 via connection 20. Information input into the system 11 can be captured and received by the parts of the system 10a shown in FIG. 1. The computer-based system 11 has a central processing unit, memory, and ports for supporting input/output connections. The computer-based system 11 is coupled to an interface 22 via connection 23, and the interface is coupled to a gateway 25 via connection 24 and a telephone switch 26 via a connection 27. The information output from the computer system regarding the progress of the participants in the competition can be transmitted and displayed by the parts of the system 10b shown in FIG. 2. Moreover, all this information may be transferred to a television or cable provider server for broadcasting the competition in real-time, on a tape-delayed basis, or in an on-demand basis.

The computer-based system 11 is coupled to the gateway 25 via connection 28 and the broadcast interface station 78b via connection 78a. The broadcast interface station 78b is coupled to the gateway 25 via connection 56. The broadcast interface station 78b is coupled to a television/video network system 58 via connection 57. The television/video network system 58 is coupled to the Internet 59a via connection 59.

The television/video network 58 is coupled to various broadcast or display units via connection 72. These display units include, for example, a television 76, video display 73, high definition television/video display TD 75, and real-time pay-per-view displays 74. These monitors and displays will receive and display video and television video and sound coverage of the competition in real-time or as previously recorded. The previously recorded video and sound presentations will be maintained and deposited for future use on the computer-based system 11 working in conjunction with database memory 21.

The Internet 59a is coupled to web-based and mobile Internet Protocol (IP) access components via connection 60. The mobile IP and web-based components coupled to connection 60 include remotely-coupled devices such as a computer 61, a smart monitor screen display 62, or a smart mobile phone device SC 63. The connection 60 may also link the Internet 59a to a gateway 64, which is coupled to a radio access network substitution SS 66.

The network substation SS 66 is coupled to a remote access network antenna 68 via connection 67. The antenna 68 is coupled via wireless radio electronic connection 69 to one or more mobile units 70a, 70b, and/or 70c. These display and computer devices may also be coupled to the computer-based system 11 through a telephone system such as that shown at 34 in FIG. 1.

All of these mobile units 70a, 70b, 70c and remotely coupled computers 61 and 63 and monitors are capable of display web pages maintained and updated by the computer system 11 regarding the progress of the competition, real-time video of the present or past competitions, stored video coverage of the competition, participants in the present or past competitions, re-plays of video presentations or television shows based on the present or past competition, statistics/standing of past and present competitions, profiles of the participants, interviews and news reports regarding the competition or its participants, and links to related websites or sponsors' websites. The website information displayed on these devices will be prepared, maintained, and deposited in the computer-based system 11 working in cooperation with the database memory 21 and workstations $WS_1$ 15, $WS_2$ 17, and $WS_3$ 19.

Figure 3A:
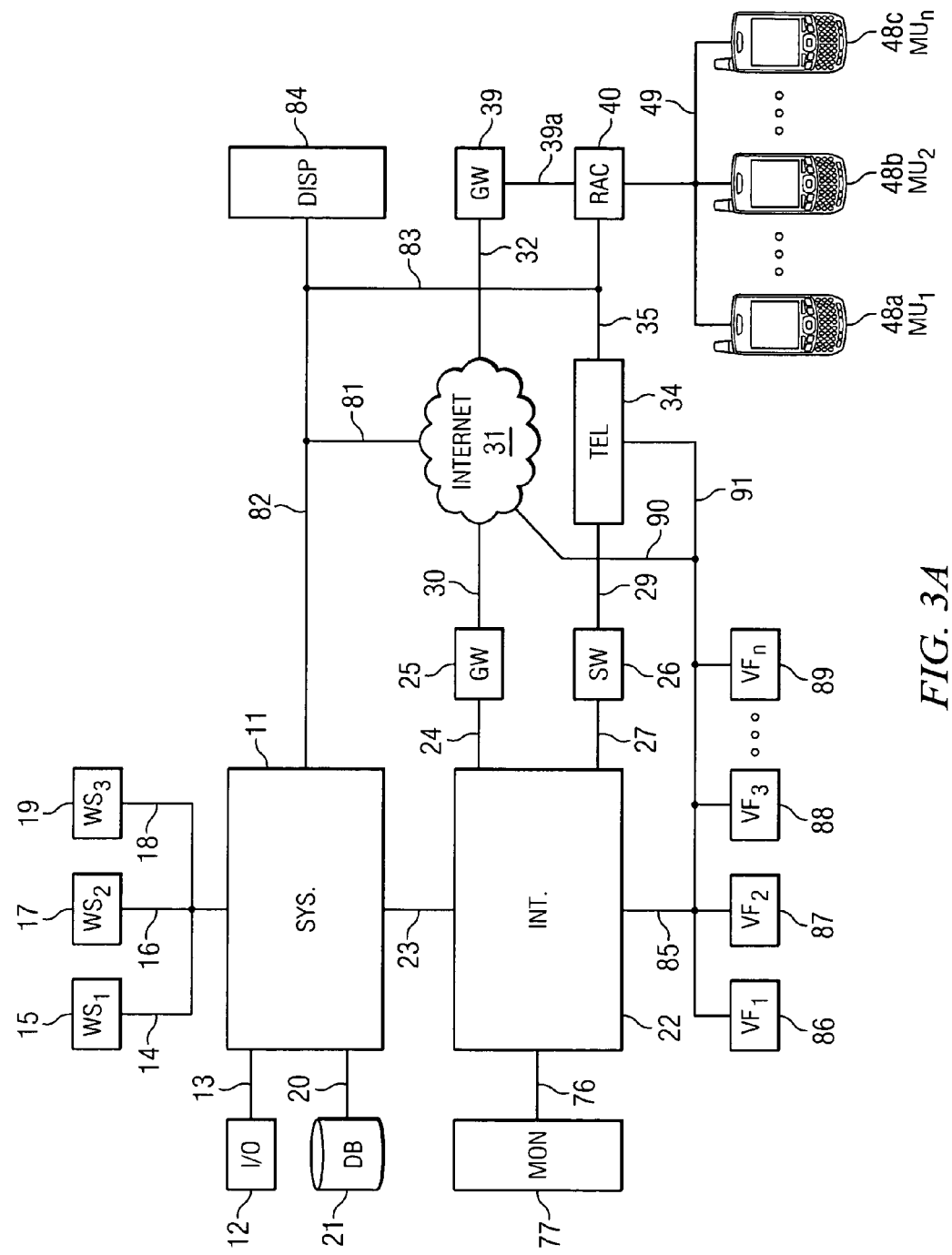
FIGS. 3a and 3b are system configurations illustrating the components and system interconnections for event monitoring and display information in the present invention, including the monitoring equipment used at various stages in the competition.

In FIG. 3a, the monitoring system components and interconnections are shown. The computer-based system 11 is coupled to database memory 21 via connection 21, to an input-output unit 132 via connection 13, and to workstations $WS_1$ 15, $WS_2$ 17, and $WS_3$ 19 via connections 14, 16 and 18, respectively. The computer-based system 11 is also coupled to a display 84 that can display information retrieved from computer-based system 11 via connection 82. The computer-based system 11 is also coupled to a monitor work station 77 via connection 77 for remote access to the computer-based system 11. The interface 22 is also coupled to a gateway 25 network via connection 24 and a telephone network switch 26 via connection 27.

The competition and progress of the participants can be monitored by the monitor workstation 77, the video and television cameras $VF_1$ 86, $VF_2$ 87, $VF_3$ 88, $VF_n$ 89 and mobile units $MV_1$ 48a, $MV_2$ 48b, and $MV_3$ 48c. The video and television cameras 86-89 can record actual footage of the competition participants for real-time play-back through the computer-based system 11 to spectators and observers using the output devices disclosed and described in FIG. 2. The spectators can select which video or television footage to watch by selecting the particular video feed component $VF_1$, $VF_2$, $VF_3$, to $VF_n$ to receive footage. The footage can be real-time or deposited in the computer-based system 11 and its database memory 21 for viewing at a later time.

The video and television feed cameras $VF_1$ 86, $VF_2$ 87, $VF_3$ 88, and $VF_n$ 89 are coupled to the interface 22 via connection 88. These devices may also be connected to the telephone switch 34 via connections 90 and 91 or the internet 31 via connection 90. The mobile units $MV_1$ 48a, $MV_2$ 48b, and $MV_3$ 48c are coupled to the computer-based system 11 through a radio access network 40, which is coupled to the mobile units 48a to 48c via connection 49. The radio access network 40 is coupled to the telephone network 34 through connection 35, and is coupled to a gateway 39 via connection 39a. The radio access network 40 is also coupled to the computer-based system 11 via connections 35, 83 and 82.

The gateway is coupled to the Internet 31 via connection 32, and the Internet is coupled to the gateway 25 via connection 30 and the computer-based system 11 via connections 81 and 82. The telephone network 34 is coupled to the telephone switch 26 via connection 29. These interfaces and interconnections all provide communication support for coupling the monitoring devices MON 77, MV$_1$ to MV$_n$ (48a to 48c) and video and television feed cameras VF$_1$ 86 to VF$_n$ 89.

Figure 3B:
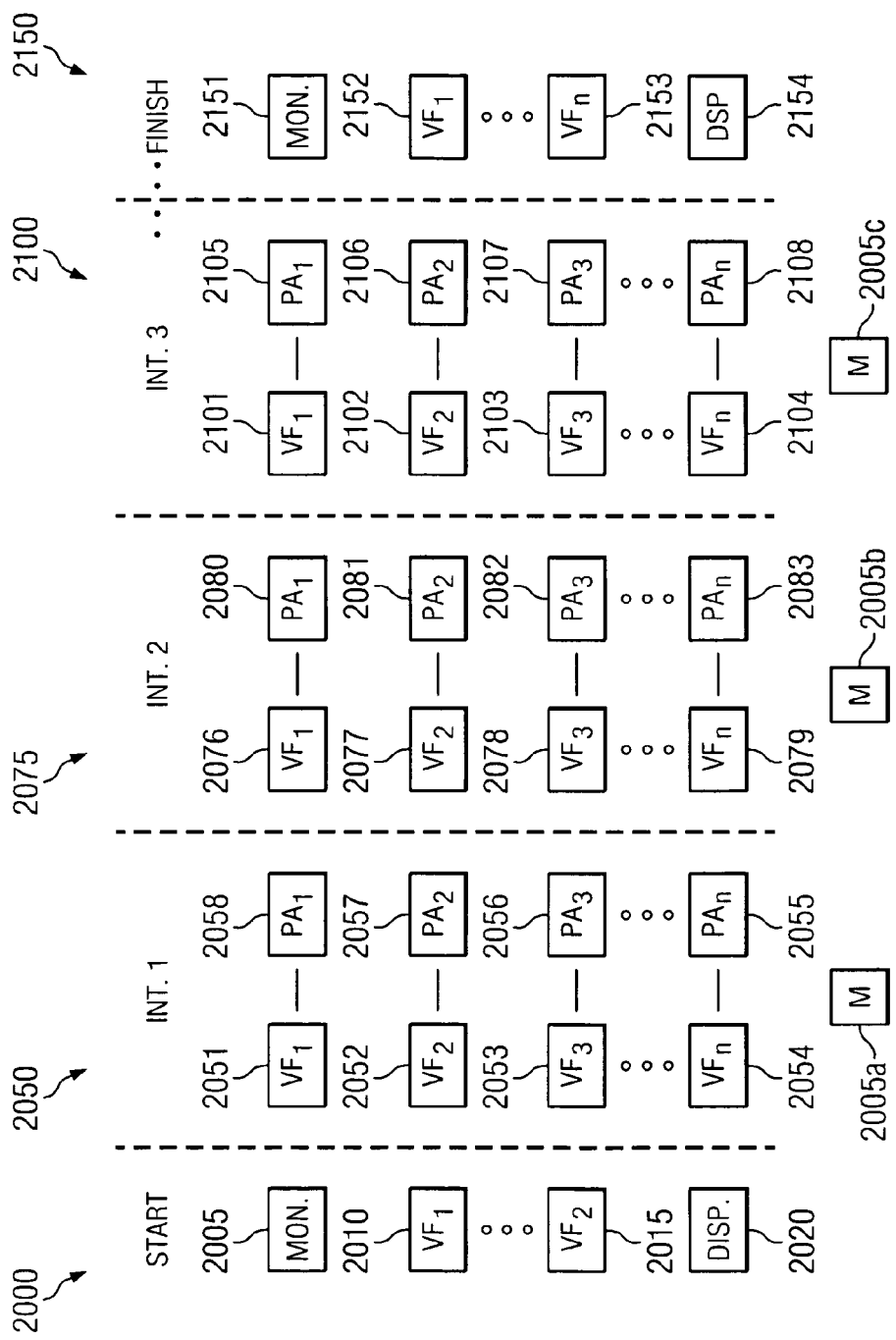

In FIG. 3b, various monitoring equipment is shown at various stages in the competition. For instance, the Start Stage 2000 is shown next to Intermediate Stage 2050, the Intermediate Stage 2 2075, then Intermediate Stage 3 2100, and the Finish Stage 2150. For the Start Stage 2000, there is an input monitor workstation shown at 2005 that is coupled to the computer-based system 11 and the video/television feed cameras VF$_1$ 2010 to VF$_n$ 2015 that provide video and sound feeds to the computer-based system 11. A large display 2020 for spectators is also located at the Start Stage, which is also coupled to the computer-based system 11. The coupling of these monitor and display components to the computer-based system 11 comports with the interconnections described in FIGS. 1, 2 and 3a.

At Intermediate Stage 1 2050, the participant PA$_1$ 2058 is monitored by video feed camera VF$_1$ 2051, which provides feed video to the computer-based system 11. At Intermediate Stage 1 2050, the participant PA$_2$ 2057 is monitored by video feed camera VF$_2$ 2052, which provides feed video to the computer-based system 11. At Intermediate Stage 1 2050, the participant PA$_3$ 2056 is monitored by video feed camera VF$_3$ 2053, which provides feed video to the computer-based system 11. At Intermediate Stage 1 2050, the participant PA$_n$ 2055 is monitored by video feed camera VF$_n$ 2054, which provides feed video to the computer-based system 11. A monitor workstation M 2005a is also located at the Intermediate Stage 1, and provides information and input regarding the progress of the contestants in the competition at Stage 1 2050 to the computer-based system 11. These components are coupled to the computer-based system 11 in the designated in FIGS. 1, 2 and 3a.

At Intermediate Stage 2 2075, the participant PA$_1$ 2080 is monitored by video feed camera VF$_1$ 2076, which provides feed video to the computer-based system 11. At Intermediate Stage 2 2075, the participant PA$_2$ 2081 is monitored by video feed camera VF$_2$ 2077, which provides feed video to the computer-based system 11. At Intermediate Stage 2 2075, the participant PA$_3$ 2082 is monitored by video feed camera VF$_3$ 2078, which provides feed video to the computer-based system 11. At Intermediate Stage 2 2075, the participant PA$_n$ 2083 is monitored by video feed camera VF$_n$ 2079, which provides feed video to the computer-based system 11. A monitor workstation M 2005b is also located at the Intermediate Stage 2, and provides information and input regarding the progress of the contestants in the competition at Stage 2 2075 to the computer-based system 11. These components are coupled to the computer-based system 11 in the designated in FIGS. 1, 2 and 3a.

At Intermediate Stage 3 2100, the participant PA$_1$ 2101 is monitored by video feed camera VF$_1$ 2105, which provides feed video to the computer-based system 11. At Intermediate Stage 3 2100, the participant PA$_2$ 2102 is monitored by video feed camera VF$_2$ 2106, which provides feed video to the computer-based system 11. At Intermediate Stage 3 2100, the participant PA$_3$ 2103 is monitored by video feed camera VF$_3$ 2107, which provides feed video to the computer-based system 11. At Intermediate Stage 3 2100, the participant PA$_n$ 2104 is monitored by video feed camera VF$_n$ 2108, which provides feed video to the computer-based system 11. A monitor workstation M 2005c is also located at the Intermediate Stage 3, and provides information and input regarding the progress of the contestants in the competition at Stage 3 2100 to the computer-based system 11. These components are coupled to the computer-based system 11 in the designated in FIGS. 1, 2 and 3a.

For the Finish Stage 2150, there is an input monitor workstation shown at MON 2151 that is coupled to the computer-based system 11 and the video/television feed cameras VF$_1$ 2152 to VF$_n$ 2153 that provide video and sound feeds to the computer-based system 11. A large display 2154 for spectators is also located at the Start Stage, which is also coupled to the computer-based system 11. The coupling of these monitor and display components to the computer-based system 11 comports with the interconnections described in FIGS. 1, 2 and 3a.

Figure 4:
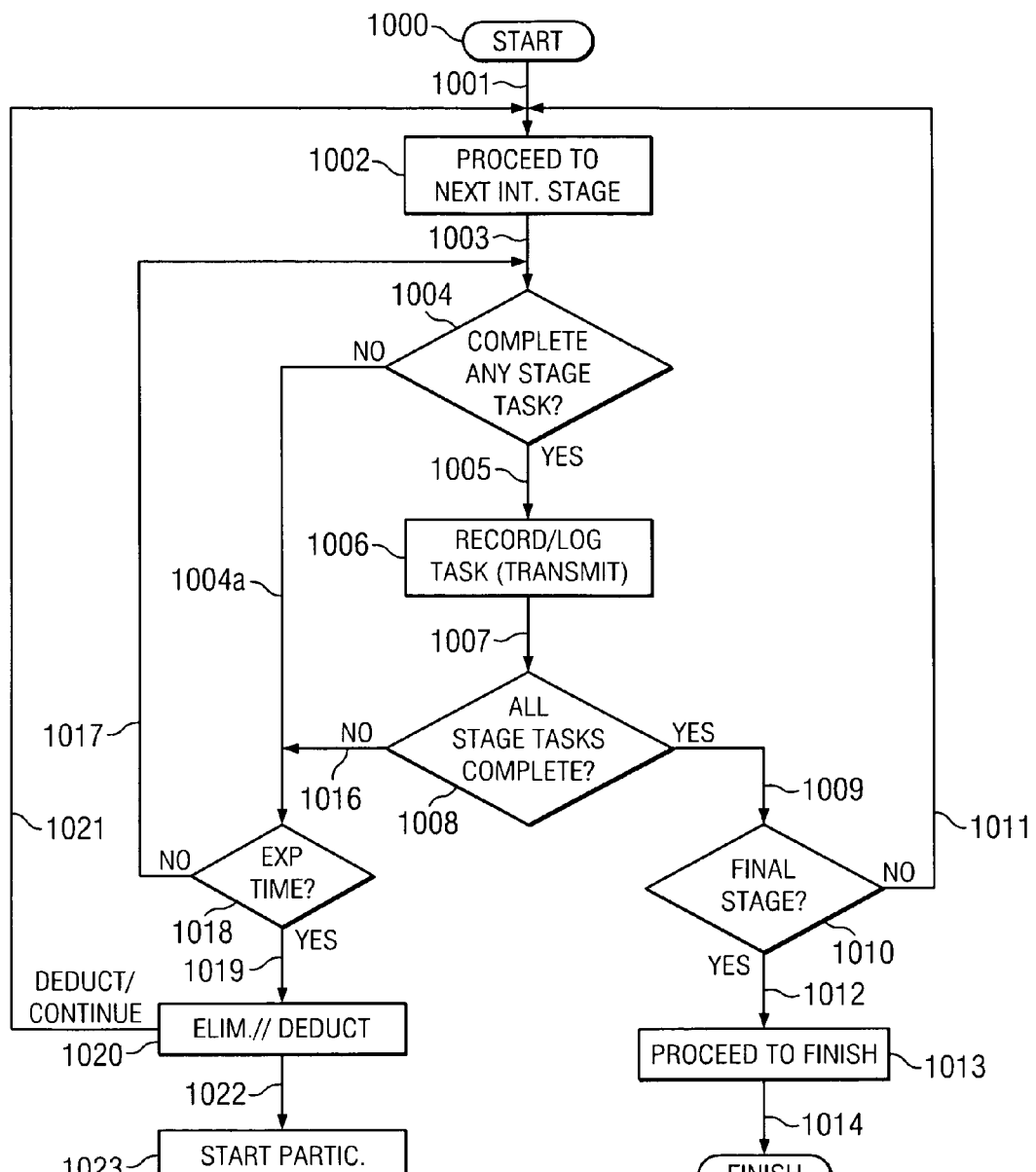
FIG. 4 is a flow-chart showing the steps involved with conducting the endurance sporting event with intermediate event-based steps.

In FIG. 4, the processing program steps conducted by the computer-based system 11 are shown starting at the Start Step 1000. From Step 1000, the process flow proceeds to Step 1002 by Step progression 1001. The Step 1002 records that the participant is entering the next Intermediate Stage. After step 1002, the program proceeds to inquiry 1004 at step progression 1003.

Moreover, the participant may have a flag pole on its vehicle or other indicator of tasks completed, which should remain unchanged until the next task is completed. At inquiry 1004, the program will inquire if the participant has completed any required tasks or events. If the answer is "no" to that inquiry, the program proceeds via step progression 1004a to inquiry 1018. At inquiry step 1018, the program inquires if the participant has used all of his or her allocated time to complete that particular Intermediate Stage, if there is a time limit assigned by the competition. If not and the participant still has an allocated time period to complete the Intermediate Stage, then the progress will proceed back to step progression 1003 and then inquiry 1004, wherein the question regarding completion of tasks will be asked again. All websites and listing of standings will remain unchanged while a task has been uncompleted, and the to-be completed tasks can be designated as uncompleted by those words or another indicia (e.g. stop sign, red dot, etc.).

If the allocated time period 1018 is expired the step progression 1019 is taken to step 1020. At that step 1020, there is a decision made based on the rules specified for the sporting competition whether the participant is eliminated from the competition or given some point deduction (or other disadvantage) so that the participant can continue to participate in the competition.

If the rules dictate elimination of the participant, the program will proceed on progression step 1022 to the stop participation box 1023. An information signal may be broadcast to the participant subject to elimination, as well as other participants that the fat that the subject participant is eliminated. Website listings and standings will be revised to show the eliminated status with some indicia like a "skull or cross bones" or "giant black X," and the participant's vehicle may be required to fly a certain flag or show a light configuration that indicates elimination (e.g. pirate's flag, or four red lights, etc.).

If the rules dictate that the participant is not eliminated from the competition, the system may send a message to the participant notifying them to proceed to the next Intermediate Stage with a "green light" indicator message, but that progression to the next Intermediate Stage was not based on completion of tasks. Instead the computer-based system 11 will notify the participant to proceed to the next Intermediate Stage, but will deduct points or provide some other disadvantage to the participant because he or she did not complete the tasks in the allocated time. Website listings and standings will be revised to show the disadvantaged or penalty status of the participant with some type of negative indicia, and the participant may have to display a negative indicia on their vehicle (e.g. red flag, red light) to show their failure to complete a stage in the allocated time. After (or simultaneous therewith during step 1021) recording the penalty, the participant will proceed to the next Intermediate Stage where the computer-based system 11 will record his or her arrival at the next Intermediate Stage at step 1002.

If at step 1004, the program will record any event or task completion by progressing through step 1005 to the record step 1006. The program operating at computer-based system 11 will be notified of task completion by the participant or observers, perhaps with photographic proof of completion. Once recorded, all websites standings and listings will be updated with an indicator that the specified task has been completed. The completion of the task may be broadcast to the other participants in the contest, and the participants participating in the contest will be notified that the task completion has been continued by the computer-based system 11 being a text message or some indicia message like a green light. The participant may also be allowed to show an indicia of task completion on his vehicle, such as fly a certain flag representative of the task or illustrating a certain light to represent task completion.

Once the task is recorded and notifications are transmitted, the progress operating on the computer-based system 11 will inquire at step 1008 whether all tasks required for the Intermediate Stage are completed. If not, the program will proceed on step progression 1016 to step progression 1004a to test the time allocation. If all tasks have been completed, the program will proceed on step progression 1009 to an inquiry of whether the final stage has been completed. If not, the program progression will proceed on step progression 1011 to step 1002 where the participant will be given a "go" indicator to proceed to the next stage, and the system will record the participants' arrival at the next stage. If so, the program will proceed on step progression 1012 to step 1013 where the participant will be given a "go" indicator to proceed to the finish line and the system will record the participants' arrival time at the finish line.

As with the other steps in the program, the messages to the participants may be given by text message or other indicia regarding the proceed step. Also, the participant may be allowed to display an indicia of stage contest completion by flying flag or flags or illuminating certain lights on their vehicle. All website standings and listings will be updated to display event status of the participant, and the stage or contest completion may be broadcast to all participants or any interested spectators of the competition.

Figure 5:
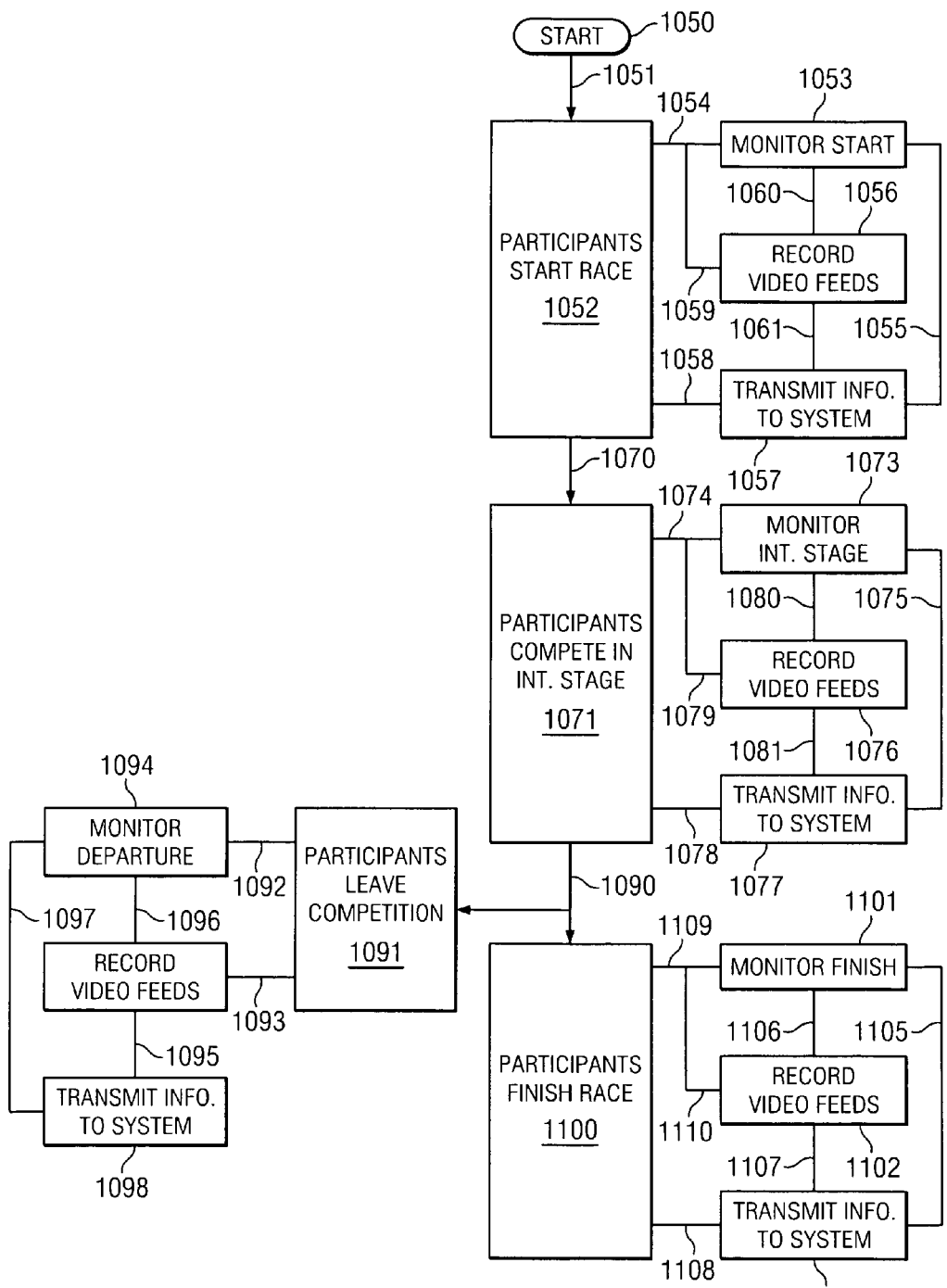
FIG. 5 is a flow-chart showing the monitoring of various activities that occur in the endurance sporting competition.

In FIG. 5, the different activities conducted at each phase of the competition are shown. This flow chart at FIG. 5 starts at the Start Step 1050, proceeds along the step progression to step 1052, where the system will monitor the start at step 1053, record video streams at step 1056 and receive information at the computer-based system 11 at step 1057. Steps 1053 are coupled to the other steps and the stage step 1052 by connections 1060, 1055 and 1054, respectively. Step 1056 is coupled to the other steps and the stage step 1052 by connections 1060, 1061 and 1059, respectively. Step 1057 is coupled to other steps and the stage step 1052 by connections 1061, 1055 and step 1058, respectively.

Step 1052 will proceed to stage step 1071 via step progression 1070, where the system will monitor the start at step 1053, record video streams at step 1056 and receive information at the computer-based system 11 at step 1057. Steps 1053 are coupled to the other steps and the stage step 1052 by connections 1060, 1061 and 1059, respectively. Step 1057 is coupled to other steps and the stage step 1052 by connections 1061, 1055 and step 1058, respectively.

Step 1052 will proceed to stage step 1071 via step progression 1070, where the system will monitor the start at step 1053, record video streams at step 1056 and receive information at the computer-based system 11 at step 1057. Steps 1053 are coupled to the other steps and the stage step 1052 by connections 1060, 1055 and 1054, respectively. Step 1056 is coupled to the other steps and the stage step 1052 by connections 1060, 1061 and 1059, respectively. Step 1057 is coupled to other steps and the stage step 1052 by connections 1061, 1055 and step 1058, respectively.

Step 1052 will proceed to stage step 1071 via step progression 1070, where the system will monitor the start at step 1053, record video streams at step 1056 and receive information at the computer-based system 11 at step 1057. Steps 1053 are coupled to the other steps and the stage step 1052 by connections 1060, 1055 and 1054, respectively. Step 1056 is coupled to the other steps and the stage step 1052 by connections 1060, 1061 and 1059, respectively. Step 1057 is coupled to other steps and the stage step 1052 by connections 1061, 1055 and step 1058, respectively.

As an overview, the systems and methods support and conduct the proposed contest from a starting position a Starting Point. The starting point may be at the same location, at the same exact time, or staggered in some fashion (e.g., (i) at different locations, at the same time; (ii) at the same location, at different times; (iii) at different locations, at different times). Each contestant (or team of contestants) are expected to catch at least one fish of one or more varieties or sizes of fish. Alternatively, in the case of a team of contestants, each member of the team may be required to catch a fish from a designated species or from a group of multiple designated species.

All contestants are expected, then, to record their catch(es) as qualifying catch(es), before moving from the first stage area to the second stage area. In each succeeding stage area, the contestant may be required to record their qualifying catch(es) in that stage area before moving to the next stage area in the contest course. Once they have recorded qualifying catches in all of the stage areas, the contestant, or team, may then proceed to the finishing point. The first contestant to reach the finishing point with qualifying catches in all stage areas, wins the contest places for the contestants, who finish the contest with qualifying catches in all stage areas, will be based on the order in which they arrive at the finishing point after completing their qualifying catches in all of the stage areas.

The invention as described herein is intended to operate in a variety of geographic settings and configurations as to the type of fishing (freshwater river, freshwater lake, saltwater bay, saltwater offshore), or Hunting (game, bird), the mode of transportation allowed (e.g., powered watercraft, unpowered watercraft, bicycle, motorcycle, automobile, foot) and the species or groups of species of fish (or other animal) targeted in the contest. Some key components or features include the elements of time, with or without breaks, as in a race, as well as endurance, over a pre-defined distance or pre-defined amount of time.

The invention is designed to offer variations in the configurations of particular contests. For example, a fishing contest could require contestants to complete a predefined course along either a saltwater coastline, or a freshwater river, or a series of unconnected lakes within a predetermined period of time. In each of the fishing variations, contestants could be required to catch specific species or combinations of specific species of fish either during their completion of the entire defined course, or before progressing from one predetermined section of the course to the next section of the course.

A hunting version of the invention could require contestants to complete a predefined course laid out over a geographic area comprising a single mass of land, or a course over several non-contiguous geographic areas, within a predetermined period of time. In each of the hunting variations, contestants could be required to shoot or photograph specific species of game or birds during their completion of the course, or before progressing from one predetermined section of the course to the next section, or before moving from one non-contiguous geographic area to the next.

Figure 6:
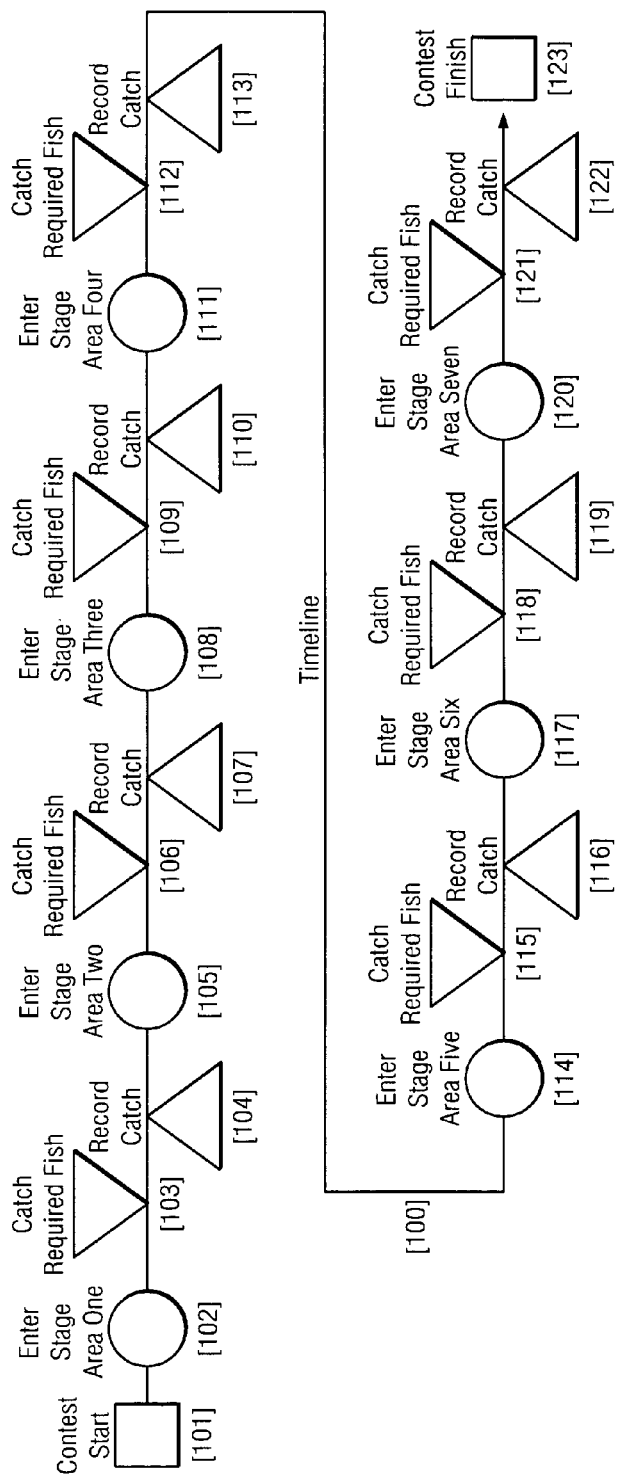
FIG. 6 is a flow chart illustrating the process that competing fishermen would follow in competing in the contest on an example Saltwater contest course, such as that shown in FIG. 2.

FIG. 6 is a flow chart showing the basic structure, method and system design of a preferred contest. In this illustration, a time line 100 is shown, starting with contest start 101 and ending with contest finish 123. Along time line 100, there are Seven (7) stage areas, each of which are denoted by a triangle pointed downward at locations 103, 106, 109, 112, 115, 118, and 1212. Of course, in alternate embodiments, the number of stage areas, along with the locations, may vary. Stage areas generally refer to the location that the specific event must occur. For instance, a contestant may be expected to catch a small mouth bass in the certain location of a river. Additional requirements may be added as well.

For instance, the small mouth bass must be caught with an artificial lure, in shallow water, from a boat. Or, the contestant may be required to catch a combination of fish, for instance a smallmouth bass, a largemouth bass, and a walleye in each stage area before moving to the next. Or, the contestant may be required to catch one smallmouth bass with an artificial lure and one small mouth bass with live bait before moving from one stage area to the next stage area. Other variations could require the contestants to begin the contest with NO BAIT, requiring them to catch their own minnows, shad or other live bait while completing the overall contest course.

Referring again to FIG. 6, upon starting the contest, at contest start 101, contestant(s) enter first stage area (stage area 1), at 102. Of course, the contest start, at 101, may physically start at first stage area (stage area 1). Contestant(s) are then expected to catch the required species of fish, at 103, and record the catch(es), at 104, in first stage area (stage area 1) before moving to the next stage area, namely second stage area (stage area 2).

After having completed the fishing and recording requirements of the previous stage area, namely first stage area (stage area 1), contestant(s) are able to enter second stage area (stage area 2), at 105. There, at second stage area (stage area 2), contestant(s) must catch the required species of fish, at 106, and record the catch(es), at 107, in second stage area (stage area 2) before moving to the next stage area, namely third stage area (stage area 3).

After having completed the fishing and recording requirements of the previous stage area, namely second stage area (stage area 2), contestant(s) are able to enter third stage area (stage area 3), at 108. There, contestant(s) are expected to catch the required species of fish, at 109, and record the catch(es), at 110, in third stage area (stage area 3) before moving to the next stage area, fourth stage area (stage area 4).

After having completed the fishing and recording requirements of the previous stage area, namely third stage area (stage area 3), contestants are able to enter fourth stage area (stage area 4), at 111. There, contestant(s) are expected to catch the required species of fish, at 112, and record the catch(es), at 113, in fourth stage area (stage area 4), before moving to the next stage area, namely fifth stage area (stage area 5).

After having completed the fishing and recording requirements of the previous stage area, the contestants are able to enter fifth stage area (stage area 5), at 114. There contestant(s) are expected to catch the required species of fish, at 115, and record the catch(es), at 116, at fifth stage area (stage area 5) before moving to the next stage area, namely sixth stage area (stage area 6).

After having completed the fishing and recording requirements of the previous stage area, the contestant(s) are able to enter sixth stage area (stage area 6), at 117. There, contestant(s) are expected to catch the required species of fish, at 118, and record the catch(es), at 119, in sixth stage area (stage area 6) before moving to the next stage area, namely seventh stage area (stage area 7).

After having completed the fishing and recording requirements of the previous stage area, namely sixth stage area (stage area 6), contestant(s)s are able to enter seventh stage area (stage area 7), at 120, which in the illustration shown in FIG. 1 is the final stage area. There, contestant(s) are expected catch the required species of fish, at 121, and record the catch(es), at 122, in seventh stage area (stage area 7), before finishing the contest, at 123.

Figure 7:
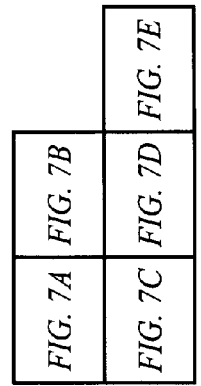
FIG. 7 is a flow chart illustrating the timeline of an example contest held along the Texas Coastal bay systems, running from Sabine Pass on the far east edge of the Texas coast, down to Port Isabel on the southern tip of the Texas coast.
Figure 7A:
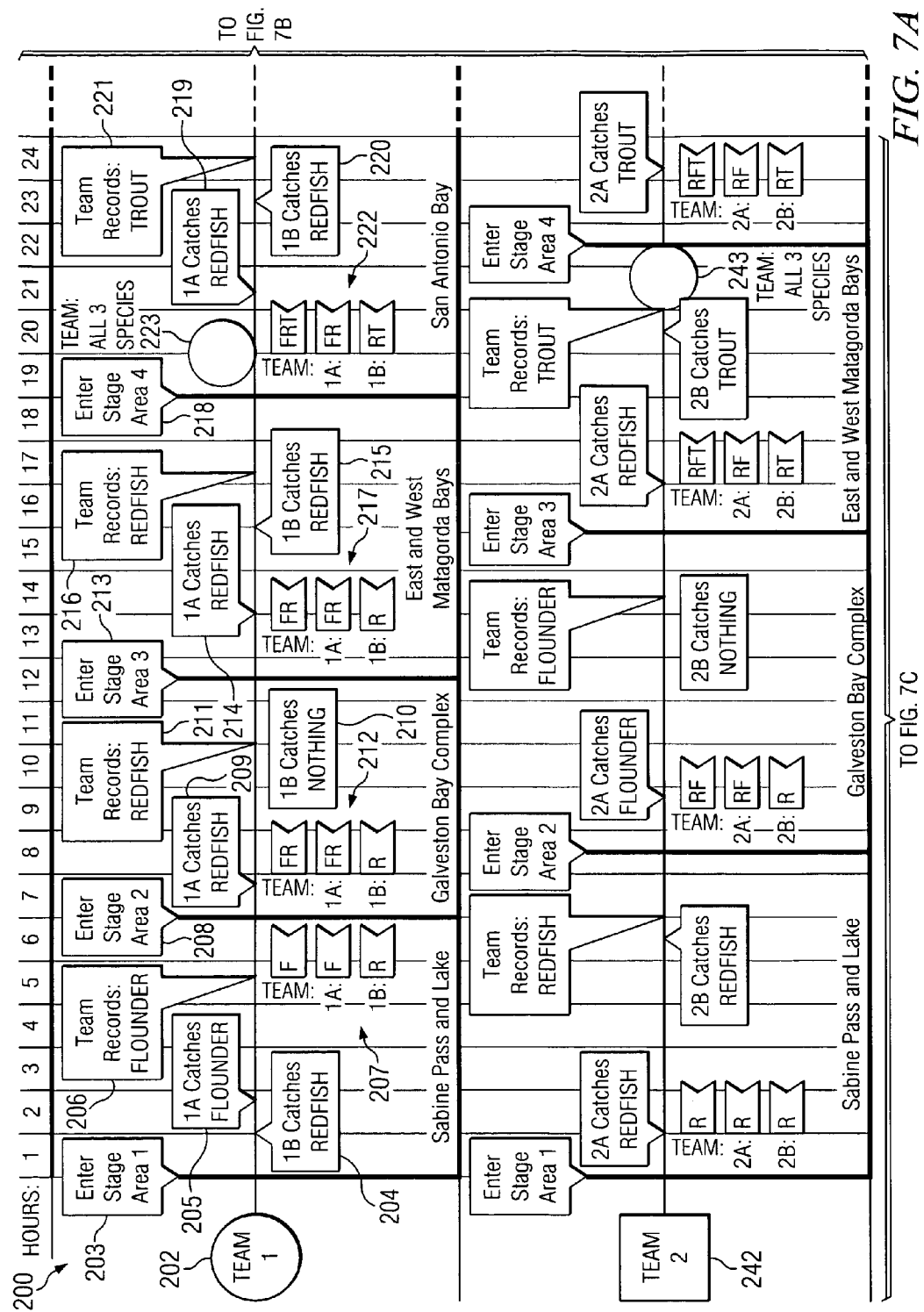
Figure 7B:
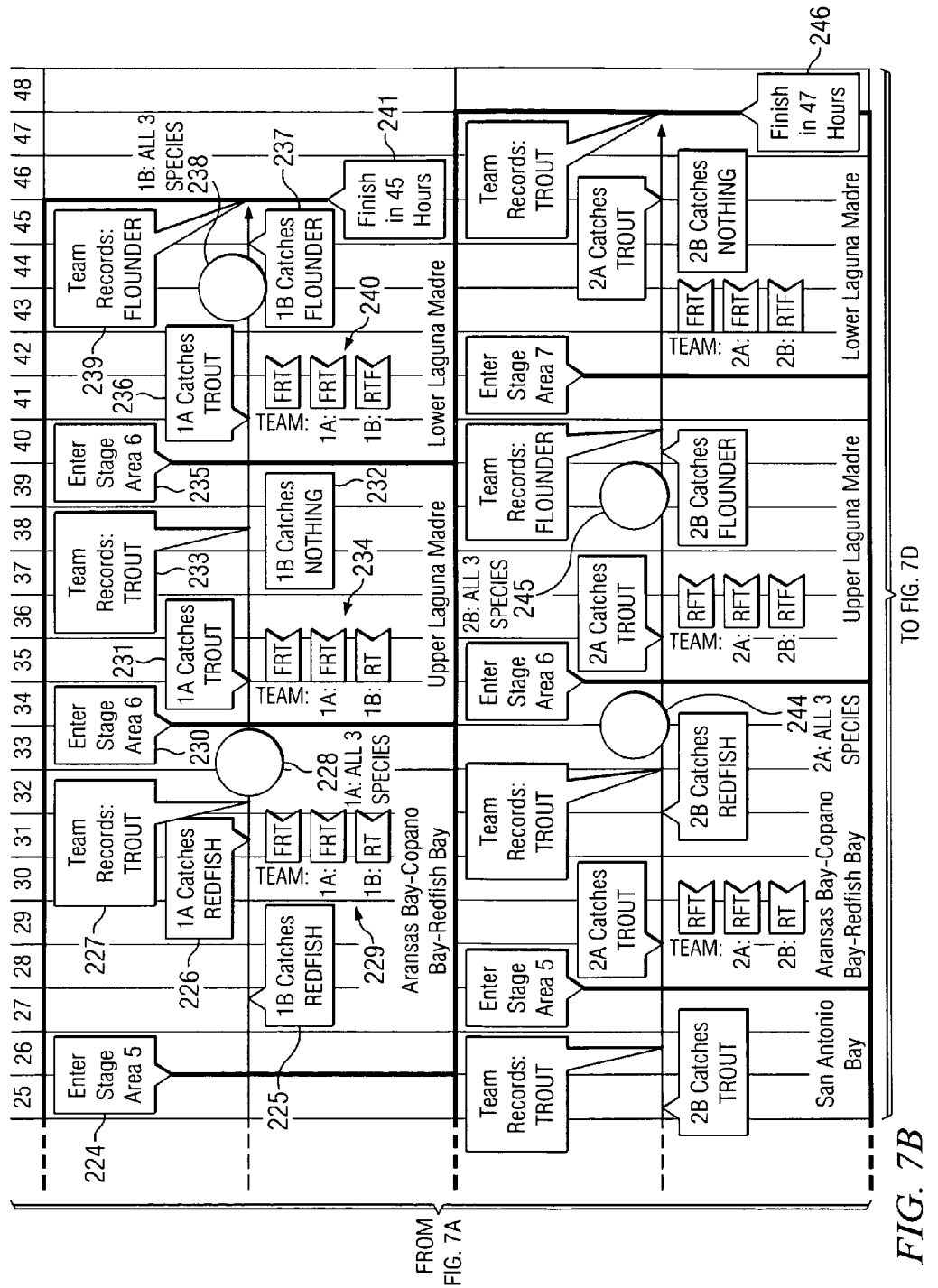
Figure 7C:
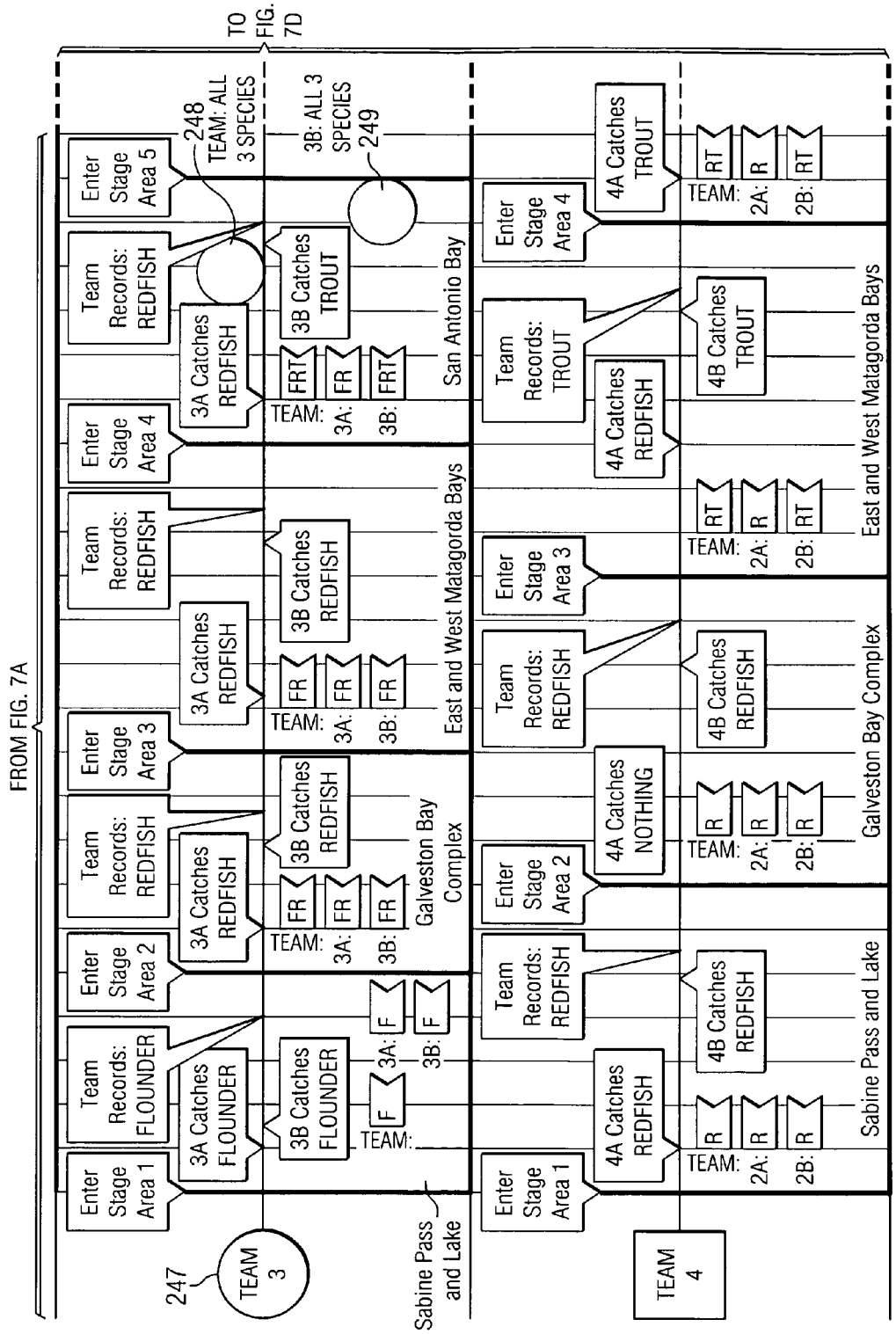
Figure 7D:
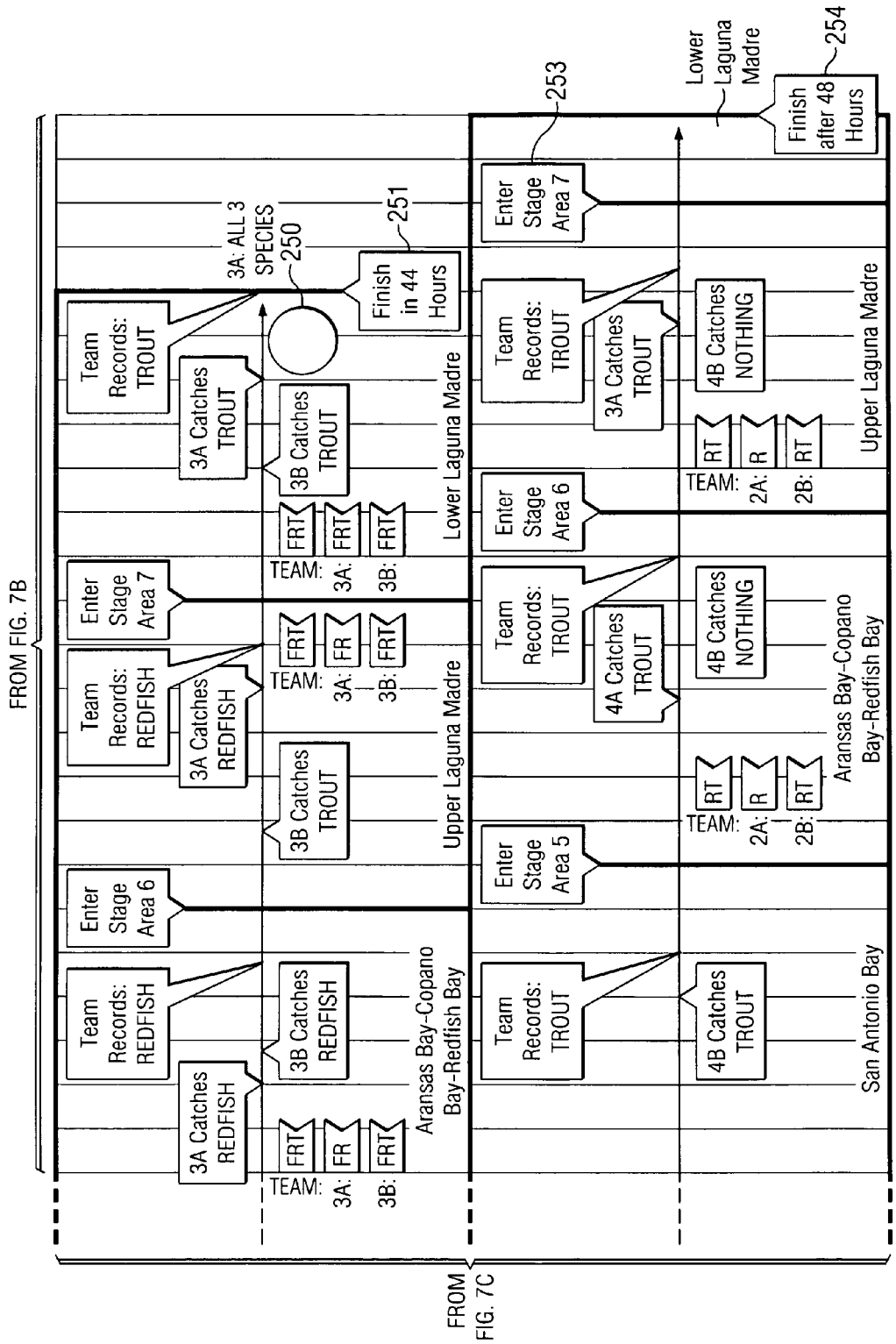
Figure 8:
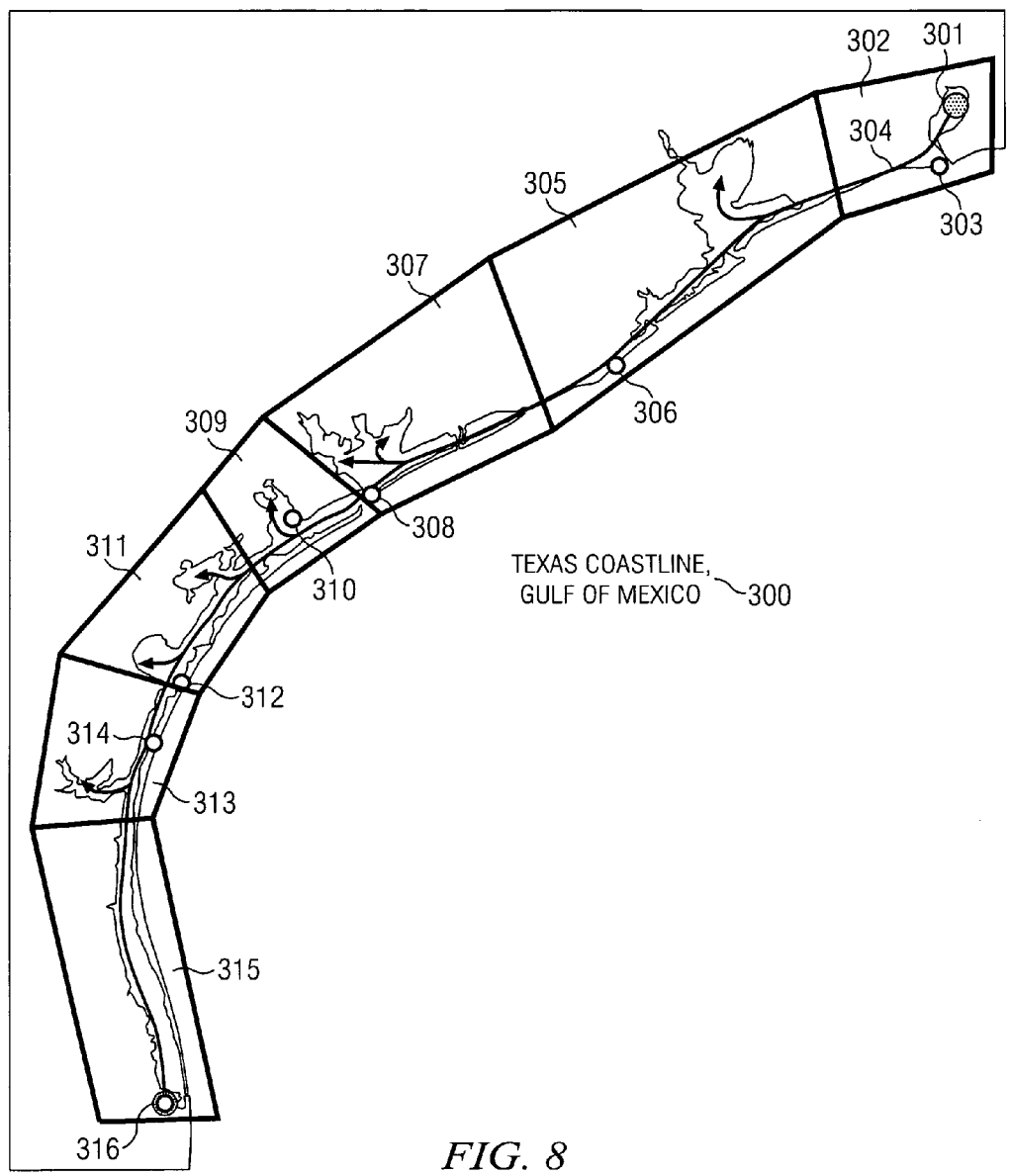
FIG. 8 is a map providing an example of a course from start to finish through the bay systems along the Texas Coast, indicating the starting point, each of seven exemplary stage areas 302, 305, 307, 309, 311, 313, and 315, each of seven stage area recording stations 303, 306, 308, 310, 312, 314, and 316, if the example contest used recording stations to record qualifying catches, and finishing point 316 of the contest.

FIG. 7 is a flow chart that shows a detailed timeline of a possible contest, with four contestants or teams of contestants competing with one another. While the geographic location of the disclosed competition may change, FIG. 8 depicts a high level map of the Texas coastline on the Gulf of Mexico, indicating the Starting Point, each of seven exemplary stage areas, each of seven (7) stage area recording stations, if the example contest used recording stations to record qualifying catches, and the finishing point of the contest.

Potential paths of contestants are shown along path 304, from Sabine Pass in the East to Port Isabel in the Southwest. As shown in FIG. 8, the Texas coastline is broken into a number of stage areas, the precise boundaries of which, of course, can be modified. Again, for the exemplary purposes only, the first stage area 302 (Sabine Pass), second stage area 305 (Galveston), third stage area 307 (Matagorda), fourth stage area 309 (San Antonio Bay), fifth stage area 311 (Aransas), sixth stage area 213 (Upper Laguna), and seven stage area 315 (Lower Laguna). Path 304 starts at contest starting point 301 and concludes at finish point 316. Circles 303, 306, 308, 310, 312, 314, and 316 designate, within each of the stage areas 302, 305, 307, 309, 311, 313, and 315, stage area recording stations or qualifying stations for stage areas 302, 305, 307, 309, 311, 313, and 315, respectively.

In particular, to be more specific geographically as a way to further understand the disclosed contest and related systems and methods, referring to FIG. 7, contest starting point 301 is in the Sabine area on the border between Texas and Louisiana (northeast edge of the Texas Gulf Coast). First stage area 302, referred to as "Sabine Pass and Lake" in FIG. 6, includes Sabine Lake and Sabine Pass. First recording station 303 at first stage area 302 (in FIG. 8) is located in a marina or waterfront facility at Sabine Pass. Competing contestants of fishermen will move between stage areas via the IntraCoastal Canal or path 304. Second stage area 305, referred to as "Galveston Bay Complex" in FIG. 7, includes East Galveston Bay, Trinity Bay, Galveston Bay, West Galveston Bay, and Christmas Bay. Recording station 306 for second stage area 305 is located at San Luis Pass, between West Galveston Bay and Christmas Bay.

Third stage area 307, referred to as "East and West Matagorda Bays" in FIG. 7, includes East Matagorda Bay, West Matagorda Bay, and Lavaca Bay. Third Recording station 308 for third staging area 307 is located on the water in Port O'Connor, Tex. Fourth stage Area 309, referred to as "San Antonio Bay" FIG. 7, includes Espiritu Santo Bay, San Antonio Bay, and Mesquite Bay. Fourth recording station 310 for stage area 309 is located on the water at Seadrift, Tex. Fifth stage area 311, referred to as "Aransas Bay-Copano Bay-Redfish Bay" in FIG. 7, includes Aransas Bay, Copano Bay, Redfish Bay, and Corpus Christi Bay.

Fifth recording station 312 for fifth stage area 311 is located at the JFK Causeway between Corpus Christi Bay and Upper Laguna Madre. Sixth stage area 313, referred to as "Upper Laguna Madre," includes the Upper Laguna Madre, Baffin Bay, and Alazan Bay. The sixth recording station 314 for stage area 313 is located on the water on the Upper Laguna Madre. And, the seventh stage area 315, referred to as "Lower Laguna Madre" includes the Upper Laguna Madre, and Arroyo Colo. The seventh recording station 316 for Seventh stage area 315 is located on the water in Port Isabel, Tex.

To further understand a disclosed contest, an example of such a contest is shown in FIG. 7. Referring to FIG. 7, timeline 200, is shown in hours, extending from left to right. Teams of contestants 1-4 are represented by various geometric shapes 202, 242, 247, and 249. Each team 202, 242, 247, and 249 enter stage area 1, at time 203. Referring to FIG. 8, stage area 1 (in FIG. 7) corresponds to first stage area 302, which is the Sabine Pass or "Sabine Pass and Lake," as shown in FIG. 7. As a point of information, the Sabine Pass is the coastal line between the States of Texas and Louisiana. Similarly, the finish line is Port Isabel, near stage area 7, which is labeled "Lower Laguna Madre" in FIG. 7, is near the border between State of Texas and Mexico.

In the example shown in FIG. 7, teams 202, 242, 247, and 249 reach the finish line, at different times, 241, 246, 251, and 254, respectively. In order to complete this course, contestants might be required to catch fish in each of seven major bay areas that lie between the start and end points. For example, as depicted in FIG. 8 and discussed above, the Texas coastline with the Gulf of Mexico, between the State of Louisiana and Mexico can be divided up into seven staging areas: (i) Sabine Pass and Lake; first stage area 302; (ii) Galveston Bay Complex; second stage area 305; (iii) East and West Matagorda Bays, third stage area 307; (iv) San Antonio Bay, fourth stage area 309; (v) Aransas Bay-Copano Bay-Redfish Bay, fifth stage area 311; (vi) Upper Laguna Madre, sixth stage area 313; and (vii) Lower Laguna Madre, seventh stage 315.

As devised and shown in FIGS. 7 and 8, a team of contestants may be required to catch one fish from a set group of fish species from each of these seven designated areas or stage areas. And, once a team of contestants has recorded the required catch in the first area, the team may proceed to the second area. When the team of contestants records the required catch in the second stage area, the team of contestants may proceed to the third, and so on. The designated species required to be caught along the way could also include a requirement that the team of contestants must catch at least one fish from each of the designated species, before completing the contest.

For example, in the above Texas coastline example shown in FIGS. 7 and 8, competing teams could be required to catch fish from the three primary in-shore gamefish species from this area, such as Southern Flounder (flounder), Red Drum (redfish), and Spotted Seatrout (speckled trout). Next, a team could move forward from the first area by catching, for example, a flounder in first stage area. Thereafter, a team may be expected to catch a redfish in second stage area, after which a team could move on to third stage area and so on. If, by the time a team reaches the final stage area, namely seventh stage area, and, if a team had caught fish from just two of the three required species, a team would have to catch the remaining species before they could finish. In other words, if by the time the team reached Port Isabel, the last stage area, seventh stage area, if the team had caught redfish and trout, but no flounder, the only species they could catch in the last area to qualify to finish would be a flounder.

In this specific example of a contest shown in FIG. 7, the proposed contest has a timeline 200 estimated to require forty-eight (48) hours for competing first to fourth teams 202, 242, 247, and 249, to finish. Though the rules may be modified, the general rule assumptions for this hypothetical contest are shown in box 203 are as shown: In particular, teams consist of two Fishermen. Transportation between stage areas is by motorized boat, no trailering is allowed. There are seven stage areas. Each team must catch one of three species in each stage area. Each team must catch at least one of the three species before finishing. Each team member must catch at least one of the three before finishing at certain stage. A team records only one species per stage area. Designated fish species are as follows: Southern Flounder (flounder), Red Drum (redfish), and Spotted Seatrout (trout).

In addition, qualifying species flags 255 (or some other indicia indicating the requirement has been met) are given to teams and team members when they record the first fish caught in each required species. To qualify to finish in the example contest described in FIG. 7, each team must record one redfish, one trout, and one flounder in any of the seven stage areas and receive a species qualifying flags for each species. Each team member must also qualify to finish by recording one redfish, one trout, and one flounder in any of the seven stage areas and receive an individual qualifying flag for each species.

Exemplary Results of First Team 202

In the example of a potential contest, the results of which are shown in FIG. 7, first team 202 enters first stage area 302 (in FIG. 8), at 203, in the first hour of the contest. In first stage area 302 (in FIG. 8), team member 1B catches a flounder, at 204, in the first hour; first team member 1A catches a flounder within the second hour, at 205. First team 202 records the flounder as its team qualifying catch for first stage area 302, at time 206. Some sort of acknowledgement, such as qualifying flags 207, are given to first team 202, for first team member 1A, for flounder, and, for second team member 1 B, for Redfish, at some sort of a qualifying station for first stage area 302.

First team 202, then, enters second stage area 305 (in FIG. 8), at time 208, in the sixth hour. First team member 1A catches a redfish in the seventh hour, at time 209. First team member 1B catches nothing in second stage area 305 (in FIG. 8), at time 210. Therefore, first team 202 records a Redfish as its qualifying catch for second stage area, at time 211 and is awarded an individual qualifying flag for flounder/redfish. First team 202 now has team flags for flounder and redfish. First team member 1A has individual qualifying flags for flounder and redfish, and first team member 1 B has a qualifying flag for redfish, at time 212.

Thereafter, first team 202 enters stage area 307 (in FIG. 8), after 11½ hours, at time 213. First team member 1A catches a redfish in the thirteenth hour, at time 214. First team member IB catches a redfish in the fifteenth hour, at time 215. First team 202 records redfish as its qualifying catch in third stage area 307 (in FIG. 8), at time 216. As a result, first team 202, first team member 1 A, and first team member 1 B qualifying flag counts are unchanged in third stage area 307 (in FIG. 8), at time 217.

First team 202 enters stage area 309, after 18 hours, at time 218. First team member 1A catches a redfish in the twenty-first hour, at time 219. Team member IB catches a trout in the twenty-third hour, at time 220. First team 202 records the trout as their qualifying catch for fourth stage area 309 (in FIG. 8), at time 221. First team 202 receives a qualifying flag for trout, first team member 1 B receives a qualifying flag for trout, first team member 1 A's qualifying flag count remains unchanged, at time 223.

First team 202 enters fifth stage area 311 (in FIG. 8), after 25 hours, at time 224. Team member IB catches a redfish in the twenty-seventh hour, at time 225. Team member 1A catches a trout in the thirty-first hour, at time 226. First team 202 records the trout as its qualifying catch for fifth stage area 311 (in FIG. 8), at time 227. Team member 1A now has all 3 qualifying species, at 228. Team member IB's qualifying flag count remains unchanged, at 229.

First team 202 enters sixth stage area 313 (in FIG. 8), after 33 hours, at 230. Team member IA catches a trout in the 34th hour, at time 231. Team member 1B catches nothing in sixth stage area 313 (in FIG. 8), at time 232. First team 202 records the trout as their qualifying catch for sixth stage area 313, at time 233. First team 202's qualifying flag counts remain unchanged, at 323.

First team 202 enters seventh stage area 315 (in FIG. 8), which is the final area, after 39 hours, at 235. Team member 1A catches a trout in the forty-first hour, at time 236. Team member 1B catches a Flounder in the 44th hour [237]. Team member 1B now has all 3 qualifying species, at 238. First team 202 record's team member 1B's flounder at the finishing point recording station, at time 239. First team 202, team member 1A, team member 1B now has all required qualifying flags, at 240. First team 202 finishes the contest in 45 hours, at time 241.

Exemplary Results of Second Team 242

Second team 242 enters first stage area 302 (in FIG. 8) at the same time first team 202 does. Second team 242 has similar experiences in first stage area 302 through seventh stage area 315 (in FIG. 8) as First team 202. Second team 242 records qualifying catches of all three (3) required species for the second team by third stage area 3, at time 243. Second Team member 2A records qualifying catches of all three (3) required species by fifth stage area 311 (in FIG. 8), at time 244, and team member 2B records qualifying catches of all three (3) required species by sixth stage area 313, at time 245. Second team 242 finishes the contest in 47 hours, at time 246.

Exemplary Results of Third Team 247

Third team 247 enters first stage area 302 (in FIG. 8) at the same time as first team 202 and second team 242. Third team 247 also has similar experiences to those of first team 202 and second team 242. Species qualifying catch requirements are met by Third team 247, at time 248 and third team member 3B, at time 249, by fourth stage area 309. Team member 3A finally meets three qualifying species catches requirement, at time 250, while fishing in seventh stage area 315. Third team 247 finishes in 44 hours, at time 251.

Exemplary Results of Second Team 249

Fourth team 249 enters first stage area 302 (in FIG. 8) at the same time as first team 202, second team 242, and third team 247. Fourth team 249 falls behind the other teams and does not enter the Seventh stage area 315, until the 46th hour, at time 253. Fourth team 249 finishes well after the 48th hour, at time 252.

Scoring Options

A variation of the rules would allow contestants to fish in teams, in which each team of 2, 3, or more fishermen would compete against other teams. This variation could either be structured so that each contestant team must catch one of the designated species before moving from one area to the next (anyone of the members could catch the one fish needed); or, every member of the contestant team could be required to catch one the designated species before moving to the next area (2 team members, 2 fish out of the designated species must be caught). Alternatively, if just one fish per team is required, the rules could require that each member must record catching at least one fish of each designated species somewhere along the course before finishing. In the example shown in FIG. 7 and discussed above, if there are two members and the team has caught a flounder in first stage area 302 (in FIG. 8), a trout in stage area 305 (in FIG. 8), a redfish in third stage areas 307 (in FIG. 8), fourth stage area 309 (in FIG. 8), and fifth stage area 311 (in FIG. 8), a trout in sixth stage area 313 (in FIG. 8), but team member A has not recorded a flounder, the team's required catch for seventh stage area 316 (in FIG. 8) would be a flounder, caught by team member A.

Alternate Ways of Recording the Event ("the Catch")

There is a multitude of ways that one can record a catch. For instance, fish caught can be released, consistent with "Catch and Release" policies, once the catch has been documented (e.g., photographed, witnessed, measured, weighed, etc.). The photograph is then submitted to contest officials, who use the photographed measurement to determine the relative size of the recorded catches, and then rank the submitted catches from all competing fishermen.

Alternatively, competing fishermen to bring the fish they have caught to a central recording station, where the fish are weighed or otherwise measured and recorded. To record a fish in these circumstances, the fisherman must present the fish alive. It is then released by officials of the fishing contest, or in some cases under the supervision of wildlife biologists or representative of local, state, or even federal game and fish authorities.

As another modification, in non-catch and release version of the preferred embodiments of the fishing contests, the competing fishermen are required to bring the fish they have caught during the contest to a central location where the fish are measured and weighed. In this version, no attention is paid to the condition of the fish (e.g., alive or dead), as long as they meet legal requirements for presiding fish and wildlife authority in whose jurisdiction the contest is conducted. Competing fishermen either keep their fish after having them recorded, or turn them into the contest officials, who in turn either donate them to relief kitchens, cook and serve them to contest participants, or simply dispose of them.

There are further modifications or alternative formulations of the preferred embodiment. One such alternative is to establish multiple recording stations along the contest route. These recording stations would be manned throughout the contest, or until the last of the registered competing fishermen or teams had recorded their required catch for that recording station's area. In the Texas Coast example above, recording stations are preferably established at easily accessible locations (ideally in Marinas or other similar water-side facilities)

in the Sabine Pass area, in the Galveston area, in the Matagorda area, on San Antonio Bay, in the Aransas Bay area, in the Upper Laguna Madre area and at the finish position in the Port Isabel area.

These recoding stations at these locations would record the weight and species of each fish submitted and then would take possession of the fish and insure that the fish were released alive. The fish would have to be alive and in survivable condition in order to be submitted and therefore recorded for qualification to move on to the next stage area. Upon having a catch recorded at a stage area's recording station, the contestant would be issued a certified flag marker for that stage area or given some other indicia of having completed the stage. A flag has the advantage of being a visible reminder to the contestant as well as communicate the success or status of the completion of each task to the other contestants. For instance, each stage area could have a different color flag mark and/or a different shape or have other indicia showing the relative place, etc. Once the flag marker was issued, the contestant, or team, would be able to proceed to the next stage area on the contest route.

An additional alternative is to employ a number of "chase vessels" to follow the competing fishermen. The "chase vessels" may be equipped with video cameras for the purpose of recording the fishing action of various competing fishermen, or teams. Each contestant, or team, would be issues a GPS tracking device so that their exact location could be recorded at all times. Each contestant, or team, would also be required to have a radio and cell phone with them, and to use these communication devices to report each catch they wish to record.

Once a catch is reported, one of the chase vessels would proceed to the GPS coordinates of the reporting fisherman, or team. When the chase vessel reaches the location of the reporting fisherman, a contest official on the chase vessel would weigh, and or measure the catch, verify that it is in a survival condition, record the catch photographically and/or video graphically, and supervise the release of the recorded fish. The contest official would then issue the contestant, or team, a certified flag marker for the stage area where the catch was recorded. With this certified flag marker, the Contestant, or team, would then proceed to the next stage area on the contest Route.

In the example of the Texas Coast contest discussed above in reference to FIGS. 7 and 8, competing fishermen, or teams, would have to possess all seven certified flag markers to finish in contention for the contest.

Scoring Methods

The outcome of the contest could be determined in two types of scoring methods.

One scoring method, referred to as a first scoring method, would simply rank the finishing contestants or teams of contestants in the order in which they successfully completed the contest, with the first to finish determined as the winner, the second to finish as second place and so on.

A second scoring method, referred to as a second scoring method, would increase the strategic complexity of the contest by using a scoring system in which points were awarded to the contestants or teams of contestants completing the contest, with several different embodiments: As a modification to this scoring method, the scoring system would award points on a sliding scale: The contestant or team of contestants who finished the contest first would get 40 points out of 100; the contestant or team of contestants who finished the contest second would get 15 points out of 100; and the contestant or team of contestants who finished the contest third would get 5 points out of 100. The remaining 40 points would be divided and awarded to the teams based on the si and/or number of fish caught.

If the contest were to designate 3 species the contestant or team of contestants who caught the largest of each species would get 10 points and the contestant or team of contestants who caught the largest number of fish would get 10 points. In this way, the contestant or team of contestants who did not finish the contest first could still accumulate the largest number of points overall and prevail in the contest. For example, if first team 202 finishes first and is awarded 40 points, and Second team 242 finishes second and is awarded 15 points, and third team 247 finishes third and is awarded 5 points, and second team 242 also has the largest fish in both Species A and Species B, and has caught the largest number of fish overall, Second team 242 will receive an additional 30 points for a total of 45 points.

If Third team 247 has the largest fish in Species C, then First team 202, who finished first, does not receive any additional points. The Scoring results would then show: First team 202, 40 points; Team 2, 45 points, Third team 247, 10 points. Second team 242 would be the overall winner. The strategic complexity of this scoring method would reward contestants or teams of contestants who were able to more successfully apply their fishing skills (and luck) while also successfully completing the contest course in at least the top three positions. In this case, a contestant or team of contestants who found the opportunity to record more or larger fish might make the strategic decision to slow their pace in order to capitalize on the catch opportunities. The modification would require that more than one fish per contestant, or per member of a team of contestants, could be recorded in each stage area, with the largest of the selected species of fish being used as the Qualifying Catch.

A potential modification to this second scoring method could be used where a contest designated only one species of fish, the system would still award a sliding scale of points to the order of contestants or teams of contestants who finish in the first three positions. But, the system would then award the remaining points to the largest single fish and the largest number of fish recorded by all finishers.

For example, first to finish would get 40 points out of 100; second would get 15 points out of 100; third would get 5 points out of 100. Then, the contestant or team of contestants who caught the largest overall fish would get 30 points; and the largest overall number of fish would get 10 points. If first team 202 finishes first and gets 40 points, but Second team 242 finishes second and also catches the largest fish, and third team 247 finishes third for 5 points, and has the largest number of fish, the scoring results would be: First team 202, 40 points; team 2, 45 points; third team 247, 15 points. Second team 242 wins. If first team 202 finished third with the most fish, but also had the largest single fish, the result would be: First team 202, 40 points; team 2, 15 points; third team 247, 45 points. Third team 247 wins.

These modifications have the advantage of making it possible for contestants, or teams of contestants, who do not finish in the top three positions, to be awarded at least as many points as the first to finish (however, in the case of a tie between the first finisher and another contestant, the first finisher would be declared contest winner).

Figure 9:
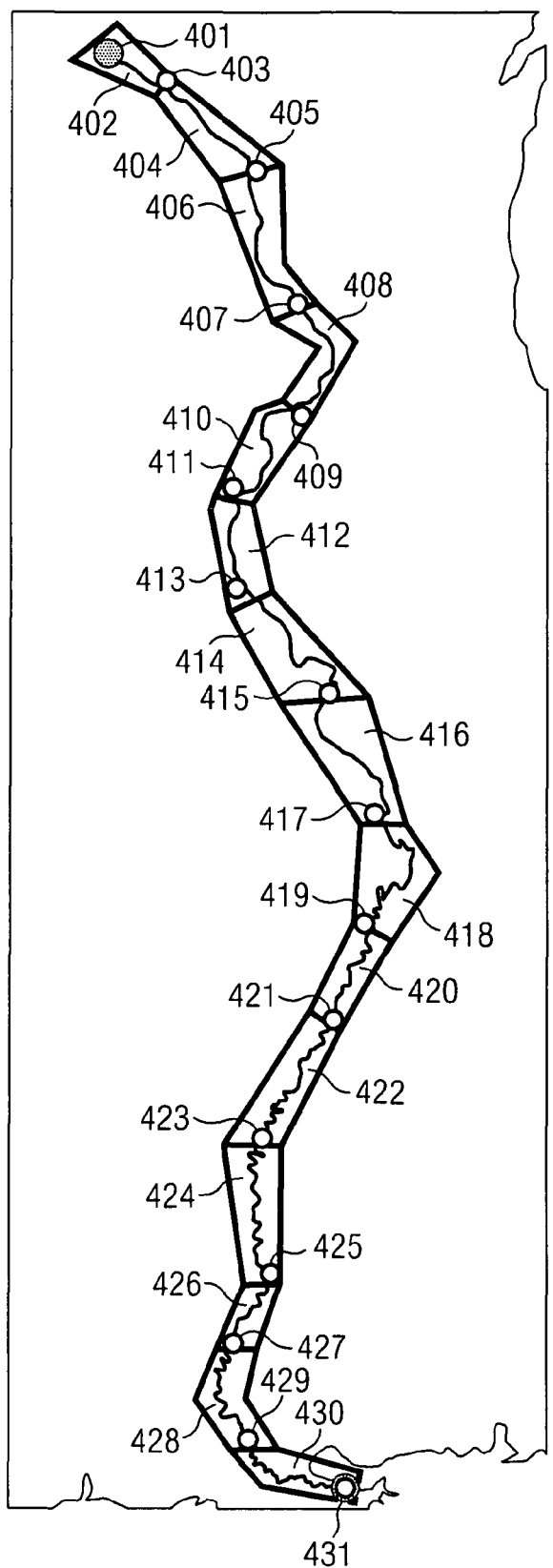
FIG. 9 is a map providing an example of a course from start to finish through a River (riparian) Freshwater Contest Course, in this illustration, the example of a contest held on the Mississippi River, from Minneapolis-St. Paul to New Orleans.

FIG. 9 is a map providing an example of a course from start to finish on The Mississippi River, indicating the Starting Point, each of 15 Example stage areas, each of 15 stage area recording stations, if the example contest used recording stations to record Qualifying Catches, and the Finishing Point of the contest. In this example, the contest starting point 401 is in the Minneapolis-St. Paul, Minn. area.

First stage area 402 is in the Minneapolis-St. Paul area and runs from the starting point 401 in the Minneapolis-St. Paul area to a recording station 403 at Bay City, Wis., which is approximately 100 miles downriver from the starting point 401.

Second stage area 404 is in the La Crosse area and runs from the recording station 403 to a recording station 405 at La Crosse, Wis., which is approximately 1500 miles downriver from the first stage area 402.

Third stage area 406, Dubuque, runs from the recording station 405 to a recording station 407 at Dubuque, Iowa [407], approximately 180 miles downriver from second stage area 404.

Fourth stage area 408, Quad Cities, runs from just below Dubuque, Iowa to the recording station 409 for fourth stage area at Rock Island, Ill., approximately 150 miles downriver from third stage area.

Fifth stage area 410, Fort Madison, runs from just below Rock Island, Ill. to the recording station 411 for fifth stage area 410 at Fort Madison, Iowa, approximately 150 miles downriver from fourth stage area.

Sixth stage area 412, Hannibal, runs from just below Fort Madison, Iowa to the recording station 413, at Hannibal, Mo., approximately 140 miles downriver from fifth stage area 410.

Seventh stage area 414, St, Louis, runs from just below Hannibal Mo. to the recording station 415 for seventh stage area 414, at St. Louis, Mo., approximately 180 miles from sixth stage area 412.

Eighth stage area 416, Cape Girardeau, runs from just below St, Louis to the recording station 417 for eighth stage area 416 at Cape Girardeau, Mo., approximately 170 miles downriver from seventh stage area 414.

Ninth stage area 418, Caruthersville, runs from just below Cape Girardeau, Mo. to the recording station 419 for ninth stage area 418 at Caruthersville, Mo., approximately 150 miles downriver from eight stage area 416.

Tenth stage area 420, Memphis, runs from just below Caruthersville, Mo. to the recording station 421 for tenth stage area 420 at Memphis Tenn., approximately 130 miles downriver from ninth stage area 418.

Eleventh stage area 422, Rosedale, runs from just below Memphis, Tenn. to the recording station 423 for eleventh stage area 422 at Rosedale, Miss., approximately 180 miles downriver from tenth stage area.

Twelfth stage area 424, Vicksburg, runs from just below Rosedale, Miss. to the recording station 425 for twelfth stage area at Vicksburg, Miss., approximately 180 miles downriver from eleventh stage area 422.

Thirteenth stage area 426, Natchez, runs from just below Vicksburg, Miss. to the recording station 427 for thirteenth stage area at Natchez, Miss., approximately 100 miles downriver from twelfth stage area 424.

Fourteenth stage area 428, Baton Rouge, runs from just below Natchez, Miss. to the recording station 429 for stage area 14 at Baton Rouge, La., approximately 120 miles downriver from thirteenth stage area 426.

Fifteenth stage area 430, New Orleans, the Finish Line stage area, runs from just below Baton Rouge, La. to the recording station 431 for fifteenth stage area 430 at the Finishing Point 431 in New Orleans, La., approximately 150 miles downriver from fourteenth stage area 14.

Additional Embodiments

Another variation on this invention is the possibility of applying it in other fields of outdoor sporting competition. One example would be a similar contest in the field of hunting. For example, a contest covering a predetermined geographic course, similar to those geographic courses used in the fishing competition examples, could involve hunting for a variety of species, including dove, turkey, ducks, geese, feral hogs, predators, deer, sheep, elk. Just as with the fishing example, the hunting version could involve multiple species in a single contest. It could also involve a limited time period in which contestants were required to complete the geographic course.

An example contest could be one in which contestant hunters would be required to hunt ducks along the entire Texas Coastline and to shoot one of a group of subspecies of duck, for example, Gadwall, Widgeon, Mallard, and Pintail in each stage area before moving to the next stage area. As with the fishing example, they could also be required to shoot at least one of each species before completing the contest. Note it is also possible to string together hunting seasons, such as a hunter would be expected to hunt ducks in a duck season, in Texas, and a deer, in deer season, in Colorado. While the invention has been particularly shown and described with respect to preferred embodiments, it will be readily understood that minor changes in the details of the invention may be made without departing from the spirit of the invention.

Having described the invention, I claim:

1. A system for conducting and monitoring an endurance sporting competition with intermediate stages, comprising:
   a computer server having a central processing unit, one or more input/output communication ports for sending and receiving electronic transmissions, associated memory for storing digital information, a database memory for storing digital information relating to the sporting competition, and a communication interface;
   one or more mobile units associated with a participant in the competition transmit information signals to the computer server regarding the progress of one or more participants in the sporting competition;
   a global positioning unit associated with one or more of the sporting competition participant's vehicles, said global positioning unit receiving positioning satellite signals in order to calculate positioning and location information and transmitting positioning and location information to the computer system;
   said computer server monitoring the progress of one or more participants in the sporting competition through the receipt of information signals regarding event-based information and completion of intermediate stage tasks, said wherein one or more information signals relating to the completion of tasks at said intermediate stage includes uploading of information onto the computer server, social network site or applications program devoted to the participant or the sporting competition, and computer server transmitting a first instruction to one or more of the participants in the sporting competition to proceed to a next stage in the sporting competition if all tasks in an intermediate stage in the competition have been completed, or transmitting a second instruction to one or more of the participants in the sporting competition indicating that said one or more participants is eliminated from the competition upon a failure to complete all tasks in an intermediate stage in a predetermined time period.

2. The system in claim 1 wherein the computer server receives visually recorded video signals that show the activities conducted by one or more participants in the sporting competition.

3. The system in claim 1 wherein the video signal can be accessed from the computer server in real-time or in a time-delayed recorded basis.

4. The system in claim 1 wherein interface is coupled to a communication gateway.

5. The system in claim 4 wherein a telephone switch is coupled to the gateway via a communication connection.

6. The system in claim 4 wherein the gateway is coupled to the Internet via a communication connection.

7. The system in claim 1 wherein said mobile unit is associated with a participants vehicle.

8. The system in claim 7 wherein said mobile unit is coupled by a radio signal to a radio access network antenna.

9. The system in claim 7 wherein said computer server is provided with photo documentation of a task completion.

10. The system of claim 7 wherein the format of the information signals to the computer server can be electronic mail, text messages, or instant messaging.

11. A method for conducting and monitoring an endurance sporting competition with intermediate stages, comprising the steps of:
receiving one or more information signals at a computer server, said computer server having a central processing unit, one or more input/output communication ports for sending and receiving electronic transmissions, associated memory for storing digital information, a database memory for storing digital information relating to the sporting competition, and a communication interface;
receiving said one or more information signals at a computer server from one or more mobile units associated with a participant in the sporting competition, said information signals showing the progress of one or more participants in the sporting competition;
monitoring the progress of one or more participants in the sporting competition at the computer server through the receipt of said information signals showing event-based information and completion of intermediate stage tasks, wherein said one or more information signals received by the computer server relating to the completion of tasks at said intermediate stage includes uploading of information onto the computer server, social network site or applications program devoted to the participant or the sporting competition; and,
transmitting a first instruction from the computer server to one or more of the participants in the sporting competition to proceed to a next stage in the sporting competition if all tasks in an intermediate stage in the competition have been completed, or transmitting a second instruction to one or more of the participants in the sporting competition indicating that said one or more participants is eliminated from the competition upon a failure to complete all tasks in an intermediate stage in a predetermined time period.

12. The method in claim 11 further comprising:
receiving one or more positioning and location information signals at the computer server from a global positioning unit associated with one or more of the sporting competition participant's vehicles.

13. The method in claim 11 wherein said mobile unit is coupled by a radio signal to a radio access network antenna.

14. The method in claim 11 wherein said computer server is provided with photo documentation of a task completion.

15. The method of claim 11 wherein the format of the information signals to the computer server can be electronic mail, text messages, or instant messaging.

* * * * *